(12) United States Patent
Isono

(10) Patent No.: US 8,279,338 B2
(45) Date of Patent: Oct. 2, 2012

(54) INFORMATION COMMUNICATION TERMINAL

(75) Inventor: Kazuki Isono, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 12/668,566

(22) PCT Filed: Jul. 11, 2008

(86) PCT No.: PCT/JP2008/062597
§ 371 (c)(1),
(2), (4) Date: Jan. 11, 2010

(87) PCT Pub. No.: WO2009/008507
PCT Pub. Date: Jan. 15, 2009

(65) Prior Publication Data
US 2010/0188517 A1    Jul. 29, 2010

(30) Foreign Application Priority Data
Jul. 11, 2007    (JP) .................................. 2007-182052

(51) Int. Cl.
*H04N 5/225* (2006.01)
*H04N 5/222* (2006.01)
*H04M 1/00* (2006.01)

(52) U.S. Cl. .............. 348/376; 348/333.06; 379/433.13; 455/556.1

(58) Field of Classification Search .......... 348/372–376, 348/333.01, 333.06; 455/556.1, 556.2, 557, 455/575.1, 575.4, 575.3; 386/358–363.2; 379/433.13, 433.12, 428.1, 433.01, 433.04, 379/433.06, 428
See application file for complete search history.

(56) References Cited

U.S. PATENT DOCUMENTS

| | | | |
|---|---|---|---|
| 6,999,802 B2 * | 2/2006 | Kim | 455/575.1 |
| 2001/0004269 A1 * | 6/2001 | Shibata et al. | 348/333.06 |
| 2006/0187334 A1 * | 8/2006 | Shibata et al. | 348/333.06 |
| 2006/0238637 A1 * | 10/2006 | Goto et al. | 348/333.06 |

FOREIGN PATENT DOCUMENTS

| | | |
|---|---|---|
| CN | 1797287 A | 7/2006 |
| JP | 2001-169166 A | 6/2001 |
| JP | 2001-218087 A | 8/2001 |
| JP | 2003-134212 A | 5/2003 |
| JP | 2005-277775 A | 10/2005 |

OTHER PUBLICATIONS

International Search Report for PCT/JP2008/062597 mailed Aug. 26, 2008.
Chinese Office Action for CN200880024279 issued Jul. 13, 2011.

* cited by examiner

*Primary Examiner* — Jason Whipkey
*Assistant Examiner* — Marly Camargo

(57) ABSTRACT

The information communication terminal includes a first housing having a display unit and a second housing having an operating unit. The first housing can be arranged as follows: the first state where the display unit is directed oppositely to the photographing direction of the imaging unit; the second state where the display unit is directed in the photographing direction of the imaging unit; the third state where the rotary shaft direction of the first housing is made to adjoin the direction perpendicular to the open/close shaft direction of the second housing and the display unit and the operating unit are directed to the same side; and fourth state where the direction perpendicular to the rotary shaft direction of the first housing is made to adjoin the open/close shaft direction of the second housing through the hinge and the display unit and the operating unit are directed to the same side.

13 Claims, 17 Drawing Sheets

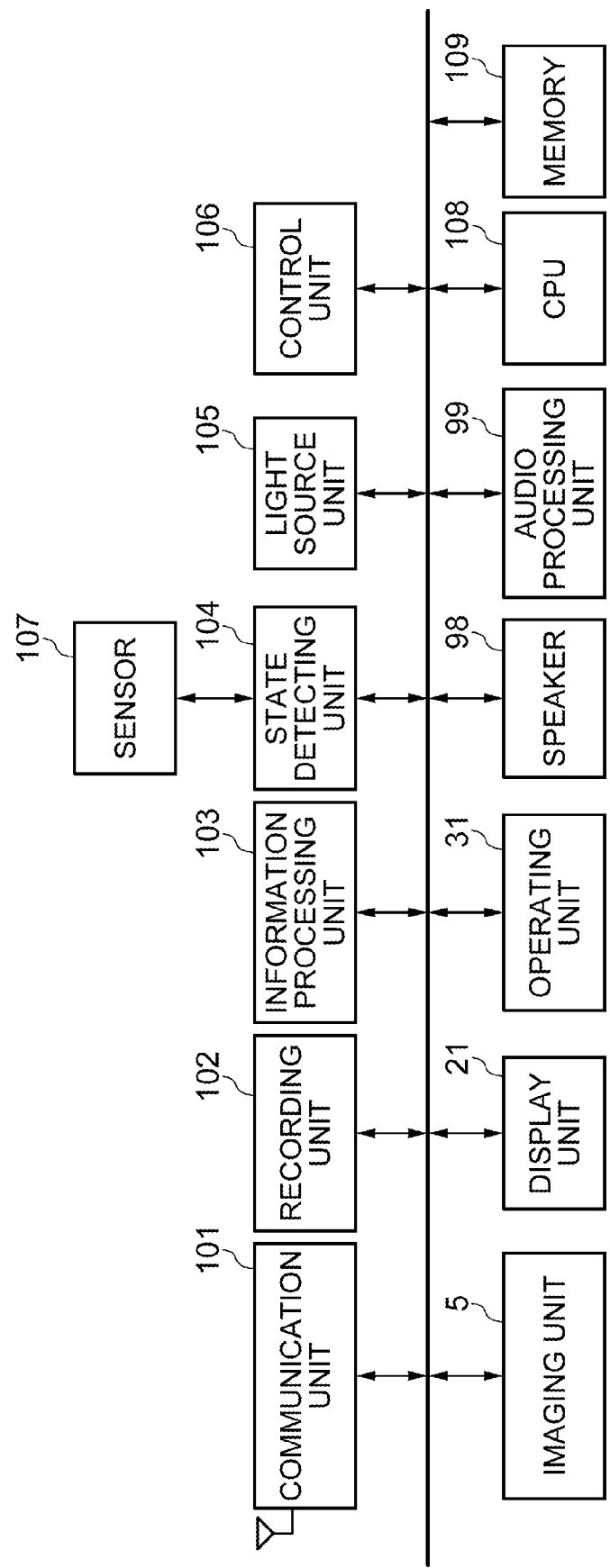

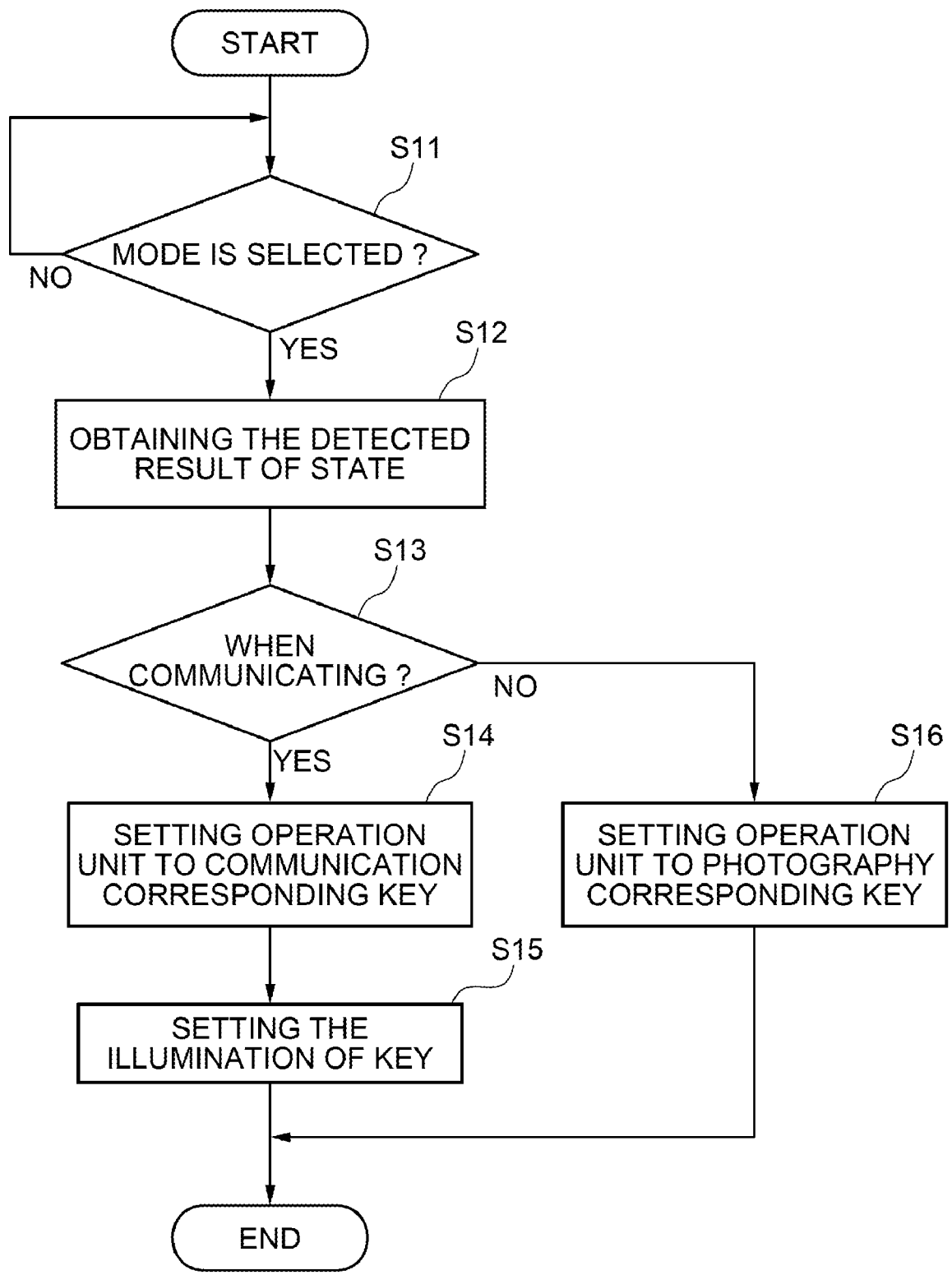

INFORMATION COMMUNICATION TERMINAL

This application is the National Phase of PCT/JP2008/062597 filed on Jul. 11, 2008, which claims priority from Japanese Patent Application No. 2007-182052 filed on Jul. 11, 2007, which is incorporated herein in its entirety.

TECHNICAL FIELD

The present invention relates to a portable information communication terminal having functions of photography, editing and communication.

BACKGROUND ART

Recently, a mobile communication terminal has a browser function such as the Internet and various functions such as E-mail and the like in addition to an audio communication function or a camera function. For example, it becomes possible to obtain or transmit a lot of information by connecting to the Internet using a portable communication terminal. Further, it becomes possible to send and receive large-capacity data such as image information using a portable communication terminal by speeding up communication lines. For example, we have more opportunities to send a photographed image to the person on the other end or the intended server immediately. In such a case, it needs to edit and send the photographed image using a communication terminal. In other words, it is preferable that a communication terminal includes functions of proceeding with a series of operations of photographing, editing the photographed image and sending the edited image without a hitch.

Further, the reduction in size and weight is required for a portable communication terminal from the standpoint of being carried. There is a limit to downsize an operation surface, while it is preferable to enlarge the size of a display screen. In order to balance between such requests, in a portable communication terminal in recent years, a display housing provided with a display screen and an operation housing provided with an operation key are connected by a hinge, and the display housing and the operation housing can be folded. Further, a communication terminal having various forms in accordance with functions to be used is developed (for example, Patent Document 1). Moreover, a communication terminal capable of improving operability to achieve various functions and preventing malfunction is provided (Patent Document 2).

Patent Document 1: Japanese Patent Application Laid-Open Publication 2003-134212
Patent Document 2: Japanese Patent Application Laid-Open Publication 2005-277775

DISCLOSURE OF THE INVENTION

Problems to be Solved by the Invention

However, in a communication terminal capable of achieving various functions, various forms of the respective housings or the operation key to be provided are not always easy to use. For example, in the case of using a photography function, the arrangement of the operation key corresponding to the form has not been provided. Further, the operation key included in a communication terminal has not been easy to use in the case of using both functions of editing a photographed image before sending it to the intended person on the other end or the intended server and of communicating.

The present invention is made in view of such a situation, and it is therefore an object of the present invention to improve the operability of an information communication terminal including functions of photography, editing and communication.

Means for Solving the Problems

An information communication terminal according to the present invention includes a first housing having a display unit, a second housing having an operating unit, a hinge unit, an imaging unit which is arranged at one end in the direction of an opening and closing shaft of the hinge unit and in which at least the opening and closing shaft is a photographing direction, and a photography operating unit to make the imaging unit operate.

Effects of the Invention

According to the present invention, it becomes possible to improve the operability of an information communication terminal having functions of photography, editing and communication.

BRIEF DESCRIPTION OF THE DRAWINGS

FIG. 1(a) is a front view, FIG. 1(b) is a back view of FIG. 1(a), FIG. 1(c) is a left side view of FIG. 1(a), and FIG. 1(d) is a right side view of FIG. 1(a);

FIG. 12 is a diagram showing a display example of image information and the like of the information communication terminal according to the exemplary embodiment 1 of the invention.

FIG. 13 is a block diagram showing a configuration example of respective functions of the information communication terminal according to the exemplary embodiment 1 of the invention;

FIG. 14 is a flowchart showing an operation example in which an operation key is set in the exemplary embodiment 1;

FIG. 15 is a diagram showing a configuration example of an operator and a light source unit.

Figure 1:
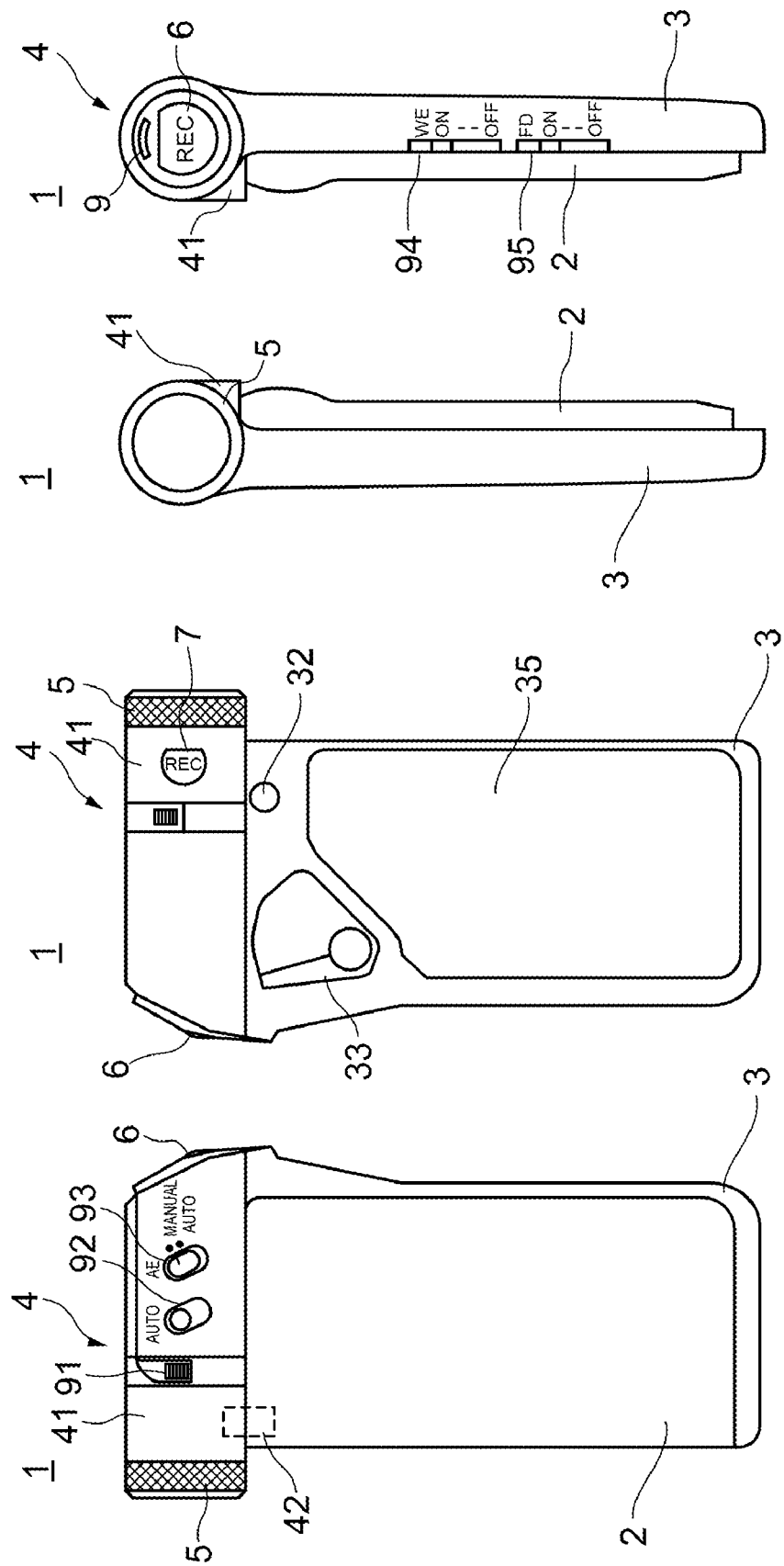
FIG. 1 is a diagram showing an example of the form for carrying of an information communication terminal according to an exemplary embodiment 1 of the invention.

DESCRIPTION OF SYMBOLS 1 information communication terminal
2 first housing
3 second housing
4 hinge unit
5 imaging unit
6 first photography operating unit
7 second photography operating unit
21, 21a to 21d display unit
31 operating unit
32 tripod screw
33 lever for changing a battery
34 operator
41 opening and closing shaft
42 rotating shaft
98 speaker
99 audio processing unit
101 communication unit
102 recording unit
103 information processing unit
104 state detecting unit
105, 105a to 105d light source unit
106 control unit
107 sensor
108 CPU
109 memory

DESCRIPTION OF EXEMPLARY EMBODIMENTS

Hereinafter, exemplary embodiments of the present invention will be explained with reference to the drawings. In order to clarify the explanation, the following description and drawings are omitted and simplified accordingly. In the respective drawings, components and corresponding parts having the same configuration or function is given the same symbols, and the explanation will be omitted.

In respective exemplary embodiments of the invention, an example of a portable information communication terminal capable of photographing an image, editing information such as the photographed image and communicating the information will be explained. However, the present invention is not limited to the application of an information communication terminal which achieves these functions.

Exemplary Embodiment 1

In an exemplary embodiment 1, an example of portable information communication terminals applying the present invention will be explained with reference to the drawings. FIGS. 1 to 11 are diagrams seeing the information communication terminal in the exemplary embodiment 1 from various directions in various situations. Further, the information communication terminal applying this exemplary embodiment is a folding portable information processing apparatus including a communication function (calling, sending and receiving e-mails and an Internet connection) or a photography function.

With reference to FIGS. 1 to 11, an information communication terminal 1 of the exemplary embodiment includes a first housing 2 having a display unit 21, a second housing 3 having an operating unit 31 and a hinge unit 4. The hinge unit 4 includes an opening and closing shaft 41 and a rotating shaft 42. The opening and closing shaft 41 connects the first housing 2 and the second housing 3 so as to open and close freely. Further, the rotating shaft 42 supports the first housing 2 so that it can rotate in a direction perpendicular to the opening and closing direction (the rotating direction) of the opening and closing shaft 41. Moreover, the information communication terminal 1 includes an imaging unit (a camera unit) 5 and at least one photography operating unit (a photography button).

FIGS. 1 to 11 show the case where the first housing 2 and the second housing 3 are in a rectangle shape, but they may be in a square shape. Further, they may be in any other shapes if the arrangement of the following forms is acceptable. Moreover, when the first housing 2 and the second housing 3 are in a rectangle shape in which one side being contact with the hinge unit 4 is short, the length of the sides is corresponded as below. The direction of the rotating shaft of the first housing 2 (a direction being parallel to the rotating shaft 42) corresponds to a longitudinal direction of the first housing 2. A direction perpendicular to the direction of the rotating shaft of the first housing 2 corresponds to a short direction of the first housing 2. Further, the direction of the opening and closing shaft of the second housing 3 (a direction parallel to the opening and closing shaft 41) corresponds to a short direction of the second housing 3. A direction perpendicular to the direction of the opening and closing shaft of the second housing 3 corresponds to a longitudinal direction of the second housing 3. The following description will be explained using a longitudinal direction and a short direction. In the case of a square shape, the sides are corresponded to the direction of the rotating shaft and the direction of the opening and closing shaft as described above.

Hereinafter, respective forms will be explained with reference to the drawings. More specifically, the respective forms at times of: being carried (FIG. 1); photographing an object (a first state, FIGS. 2 and 3); photographing the user oneself (a second state, FIGS. 4 and 5); photographing at a low angle corresponding to photography at a low position; editing the photographed image (a third state, FIGS. 6 to 9); and communicating using a communication function (a fourth state, FIGS. 10 and 11) will be explained. It is possible to develop the respective forms from the state of carrying and also possible to develop the respective forms mutually.

FIG. 1(a) to FIG. 1(d) are illustrations showing an example of the form of an information communication terminal at the time of being carried. FIG. 1(a) is a front view of the information communication terminal when being carried. FIG. 1(b) is a back view of FIG. 1(a), FIG. 1(c) is a left side view of FIG. 1(a), and FIG. 1(d) is a right side view of FIG. 1(a).

The first housing 2 and the second housing 3 is in the closed state so that the display unit 21 and the operating unit 31 face each other. The imaging unit 5 is arranged at one end in the direction of the opening and closing shaft of the hinge unit 4, and at least the direction of the opening and closing shaft is a photographing direction. Further, as a photography operating unit, a first photography operating unit 6 arranged at the other end in the direction of the opening and closing shaft of the hinge unit 4 and a second photography operating unit 7 arranged on the opening and closing shaft 41 are included. The first photography operating unit 6 is arranged on the opposite side of the imaging unit 5. Moreover, a microphone 9 for recording is provided near the first photography operating unit 6.

As the rotating shaft 42 is arranged inside of the opening and closing shaft 41 and the first housing 2, it is shown with a dotted line in FIG. 1. The dotted line showing the rotating shaft 42 indicates the position that the rotating shaft 42 supports the first housing 2, and it does not limit the shape of the rotating shaft 42. For example, the end of the rotating shaft 42 may be spherical in shape.

The rotating shaft 42 supports the first housing 2 at the end of the side on which the imaging unit 5 is arranged, of the sides perpendicular to the direction of the rotating shaft of the first housing 2. Further, the rotating shaft 42 is arranged at the end of the side on which the imaging unit 5 is arranged, of the opening and closing shaft 41. By providing the hinge unit 4 described above, the information communication terminal 1 is capable of taking four forms which will be explained below.

Further, the information communication terminal 1 includes the following components. The second housing 3 includes a tripod screw 32 to set and fix a tripod, a lever 33 for changing a battery which opens and closes the inside of the second housing 3 when changing the battery and a lid 35 for housing the battery, on the reverse side of the surface on which the operating unit 31 is arranged. The tripod screw 32 fixes the information communication terminal 1 so as to operate it easily. Moreover, the lever 33 for changing the battery makes it easy to change the battery while operating the information communication terminal 1. Especially, by devising the shape of the lever, it becomes possible to change the battery easily and quickly. Thereby, it is possible to shorten a suspended period of photography and editing work.

The second housing 3 includes a WE switch 94 and a FD switch 95. The WE switch 94 is a switch to switch ON/OFF of the function of adjusting white balance automatically. When the white balance function is ON, colors are corrected under the light of a fluorescent lamp or an incandescent lamp, and a white color is adjusted so as to always become appropriate white, for example. The FD switch 95 is a switch to switch ON/OFF of a fade function. When the fade function is ON, predetermined effects (fade-in and fade-out), which is set preliminarily, for creating scene switching on photographing is performed.

The hinge unit 4 includes a knob 91 for adjusting zoom, an AUTO switch 92 and an AE switch 93. The AUTO switch 92 is a switch to switch ON/OFF of the function of focusing automatically. When the AUTO switch is ON, focusing is performed automatically on photographing. The AE switch 93 is a switch to switch ON/OFF of the function of automatic exposure. When the AE switch is ON, shutter speed and stop size is adjusted automatically so as to adjust brightness moderately.

Figure 2:
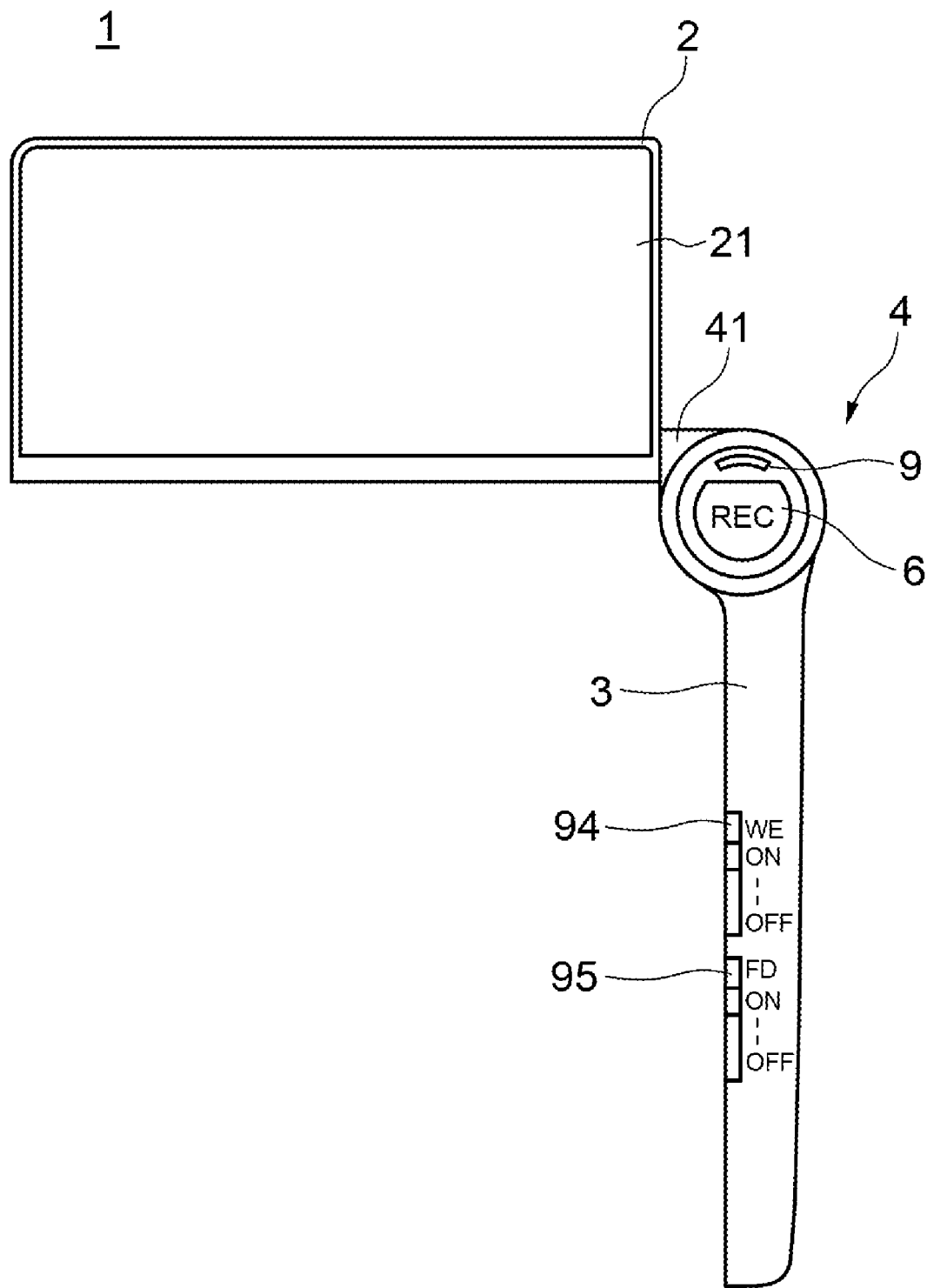
FIG. 2 shows an example of the form for photographing an object of the information communication terminal according to the exemplary embodiment 1 of the invention and is a front view seen from the side of a display unit.
Figure 3:
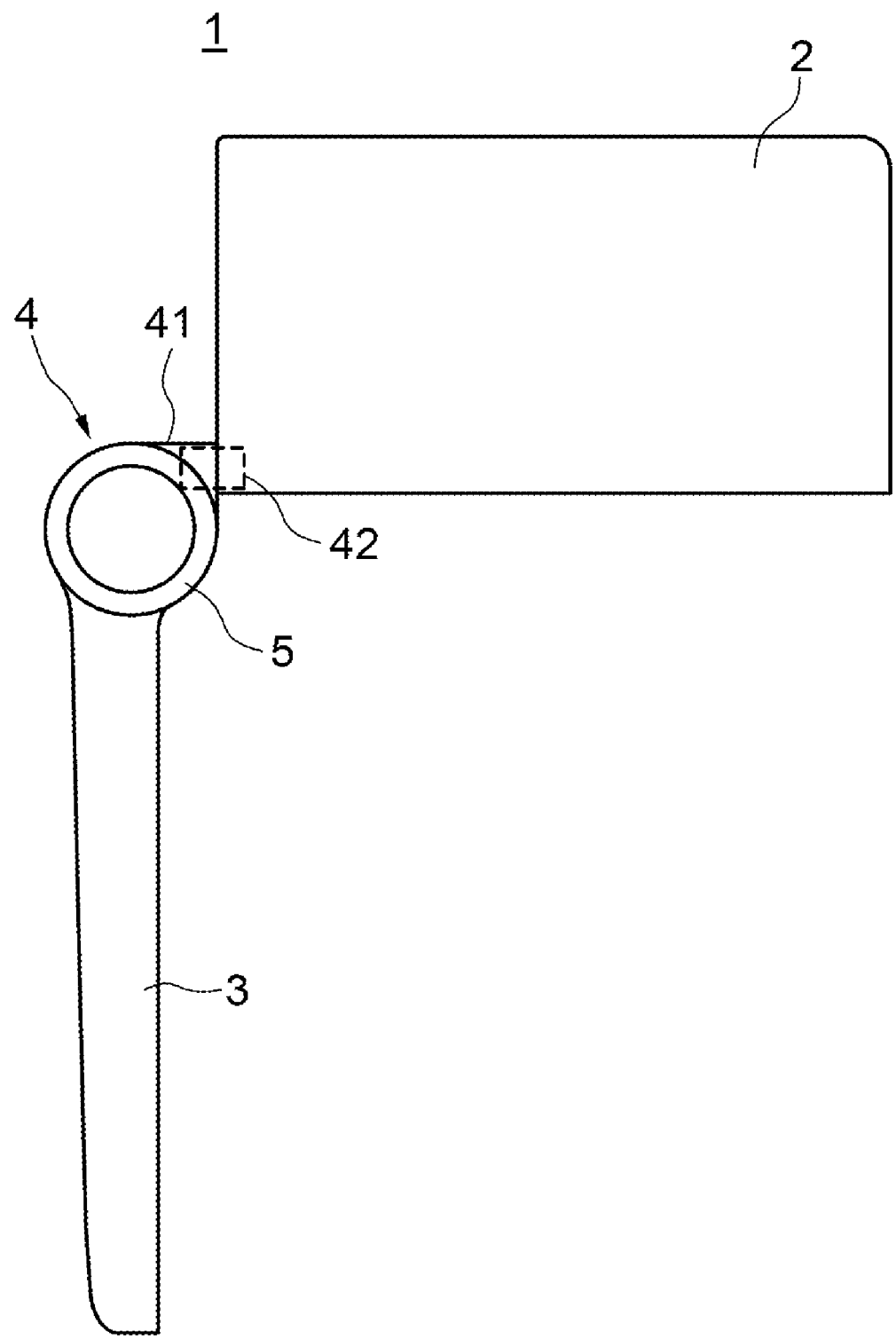
FIG. 3 is a back view of FIG. 2.

Next, the form of the information communication terminal 1 when photographing an object will be explained. FIG. 2 shows an example of the form of the information communication terminal when photographing an object, and it is a front view seen from the side of the display unit. FIG. 3 is a back view of the information communication terminal shown in FIG. 2. When photographing an object, the first housing 2 is arranged with the display unit 21 facing the opposite direction of the photography direction of the imaging unit 5. In other words, the display unit 21 and the imaging unit 5 are arranged to face oppositely. More specifically, the information communication terminal 1 is in the state that the first housing 2 is opened at 90 degrees centering on the opening and closing shaft 41 from the carrying state, and then the first housing 2 is rotated 90 degrees clockwise centering on the rotating shaft 42 so that the display unit 21 faces (exposes) the opposite side of the imaging unit 5. Therefore, the rotating shaft 42 is in the state that the longitudinal direction of the first housing 2 and the longitudinal direction of the second housing 3 are away from each other, and the longitudinal direction of the first housing 2 and the longitudinal direction of the second housing 3 form an angle with each other.

In FIGS. 2 and 3, an opening and closing angle between the first housing 2 and the second housing 3 centering on the opening and closing shaft 41 is almost a right angle, which is not limited thereto. For example, when a photographer grips the second housing 3 and photographs, it is preferable that the opening and closing angle is an angle that the photographer can photograph with stability. By gripping and supporting the second housing 3 and operating the first photography operating unit 6, the photographer can photograph an object or stop photographing. For example, the photographer pushes the first photography operating unit 6 in order to be ON (photographing) or OFF (stopping).

Figure 4:
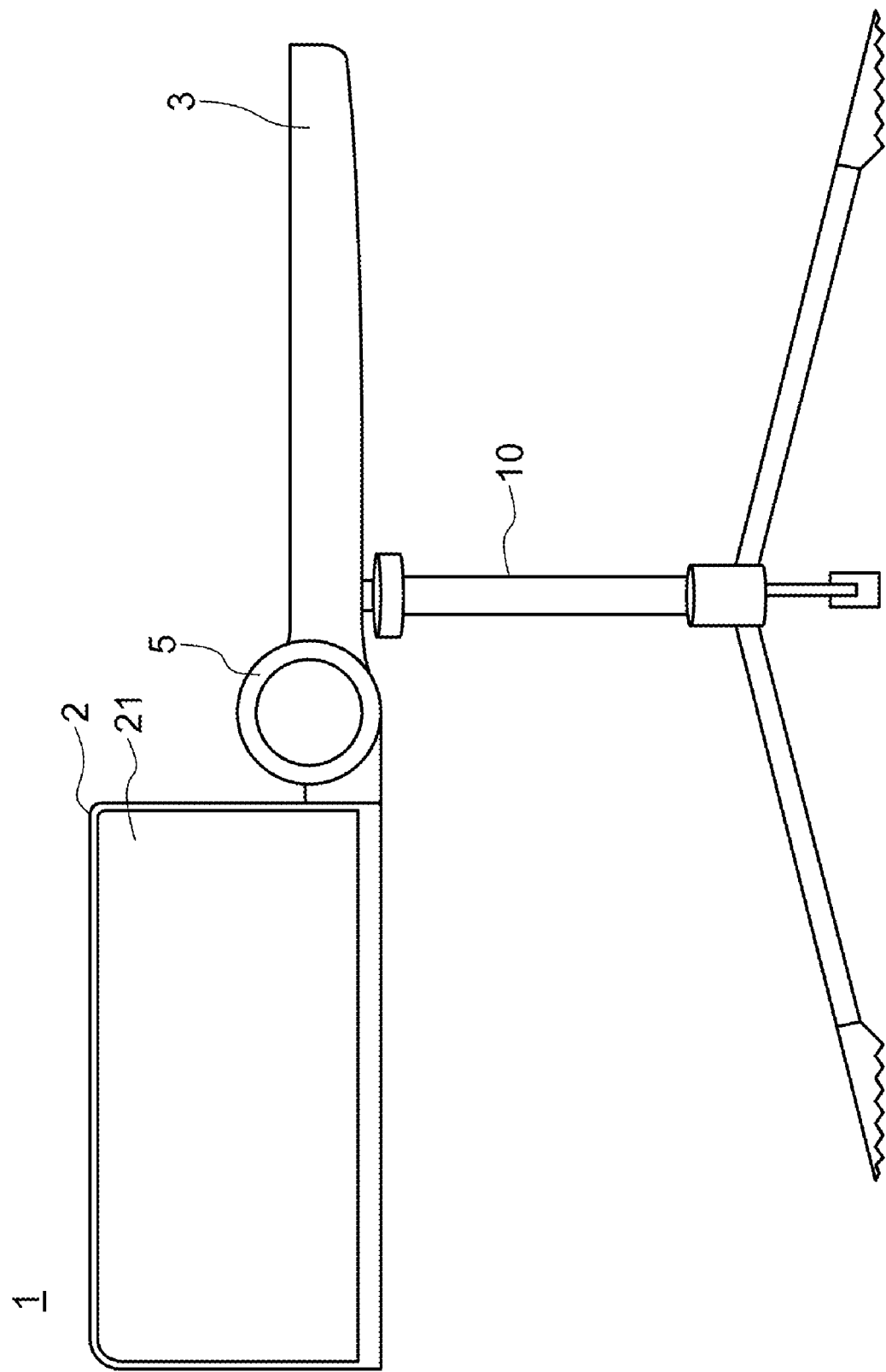
FIG. 4 shows an example of the form for photographing oneself of the information communication terminal according to the exemplary embodiment 1 of the invention and is a front view seen from the side of the display unit.
Figure 5:
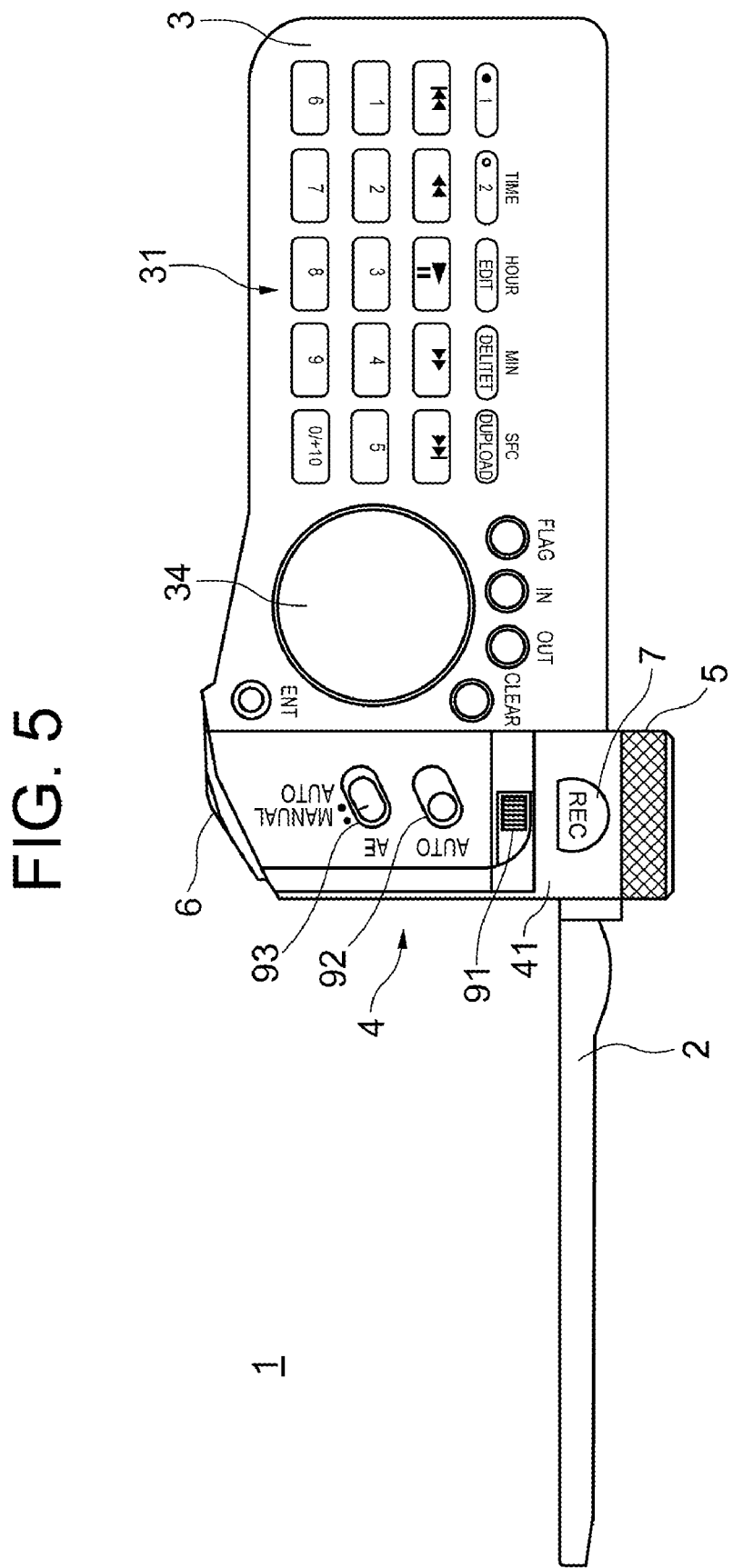
FIG. 5 is a plan view seen from the top of FIG. 4.

Next, the form of the information communication terminal 1 when photographing the user oneself will be explained. FIG. 4 shows an example of the form of the information communication terminal when photographing the user oneself, and it is a front view seen from the side of the display unit. FIG. 5 is a plan view which is seen from the top of FIG. 4. FIG. 4 shows the state that the information communication terminal 1 loads a tripod 10, and the tripod 10 is omitted in FIG. 5. When photographing oneself, the first housing 2 is arranged, with the display unit 21 facing the photographing direction of the imaging unit 5. More specifically, the information communication terminal 1 is in the state that the first housing 2 is opened 180 degrees centering on the opening and closing shaft 41 from the carrying state, and then the first housing 2 is rotated counterclockwise 90 degrees centering on the rotating shaft 42 so that the display unit 21 faces the side on which the imaging unit 5 is arranged.

Here, the display unit 21 and the imaging unit 5 do not need to face in the same direction exactly. However, they need to face the same side so that the photographer can proceed with photography while confirming the display unit 21. Thereby, the photographer can photograph while confirming the display unit 21.

Further, in FIGS. 4 and 5, the first housing 2 is supported by the rotating shaft 42 at the end of the side in a short direction and rotated in a direction perpendicular to the direction of the opening and closing shaft. Especially, the first housing 2 is supported by the rotating shaft 42 at the end of the side in the short direction near the imaging unit 5, which is the lower side of the display unit 21. Therefore, the side in the longitudinal direction of the first housing 2 and the bottom surface of the second housing 3 (the surface on the opposite side of the surface of the second housing 3 on which the operating unit 31 is arranged) can be arranged so as to be almost horizontal. Consequently, it becomes possible to set the information communication terminal 1 on a flat surface such as a table with stability when photographing oneself.

Moreover, the second photography operating unit 7 is arranged so as to be operated from above, in the arrangement shown in FIG. 5. Thereby, the photographer does not need to operate the first photography operating unit 6 which is arranged on the reverse side when photographing oneself. Therefore, the photographer can operate the second photography operating unit 7 from above the front surface of the information communication terminal 1 and instruct the start and stop of photographing. In addition, in the case of pushing the second photography operating unit 7 down, it prevent from moving back and forth, compared to the case of pushing the first photography operating unit 6 from the back to the front. Further, the photographer can operate the second photography operating unit 7 easily with one hand. As described above, operability in starting and stopping of photographing is improved. As described below, the position where the second photography operating unit 7 is arranged moves with the rotation of the opening and closing shaft 41. Therefore, the position of the second photography operating unit 7 changes depending on the opening angle between the first housing 2 and the second housing 3, centering on the opening and closing shaft 41.

In FIG. 4, the side in the longitudinal direction of the first housing 2 is parallel to the bottom surface of the second housing 3, which is not limited thereto. For example, when the photographer grips the second housing 3 and photographs, as well as FIGS. 2 and 3, the opening angle between the first housing 2 and the second housing 3 centering on the opening and closing shaft 41 may be almost perpendicular. Further, FIG. 4 shows an example in which the tripod is set to the tripod screw 32 of the second housing 3. Meanwhile, the information communication terminal may be set on a desk, a shelf or the like. Moreover, in the case where the location for setting is narrow, it is possible to reduce the area needed to set the information communication terminal by making the opening angle be almost perpendicular.

Further, the information communication terminal 1 may include a third photography operating unit to operate the imaging unit 5 by wireless communication (Near Field Communication, for example). For example, the third photography operating unit is provided as a unit which is different from the information communication terminal 1, such as a remote-control device. Thereby, the photographer can instruct to photograph from the position being away from the information communication terminal 1, without touching the information communication terminal 1, and can operate easily.

Figure 6:
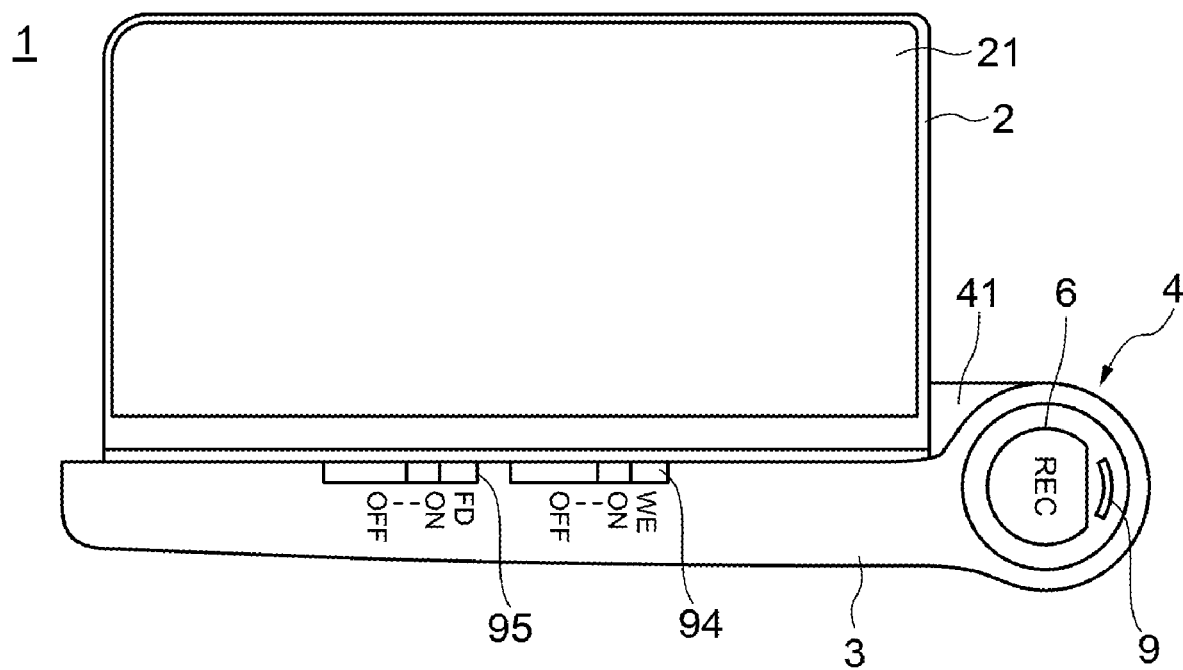
FIG. 6 shows an example of the form for photographing at a low angle or editing of the information communication terminal according to the exemplary embodiment 1 of the invention and is a front view seen from the side of the display unit.
Figure 7:
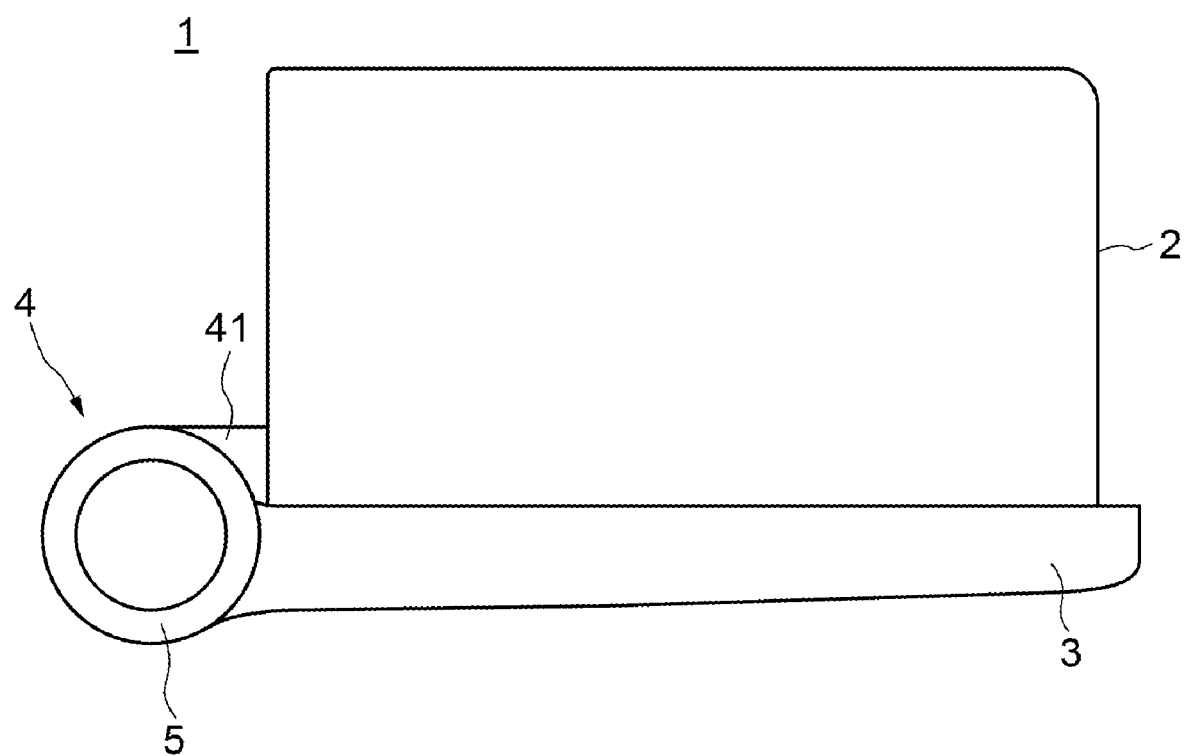
FIG. 7 is a back view of FIG. 6.
Figure 8:
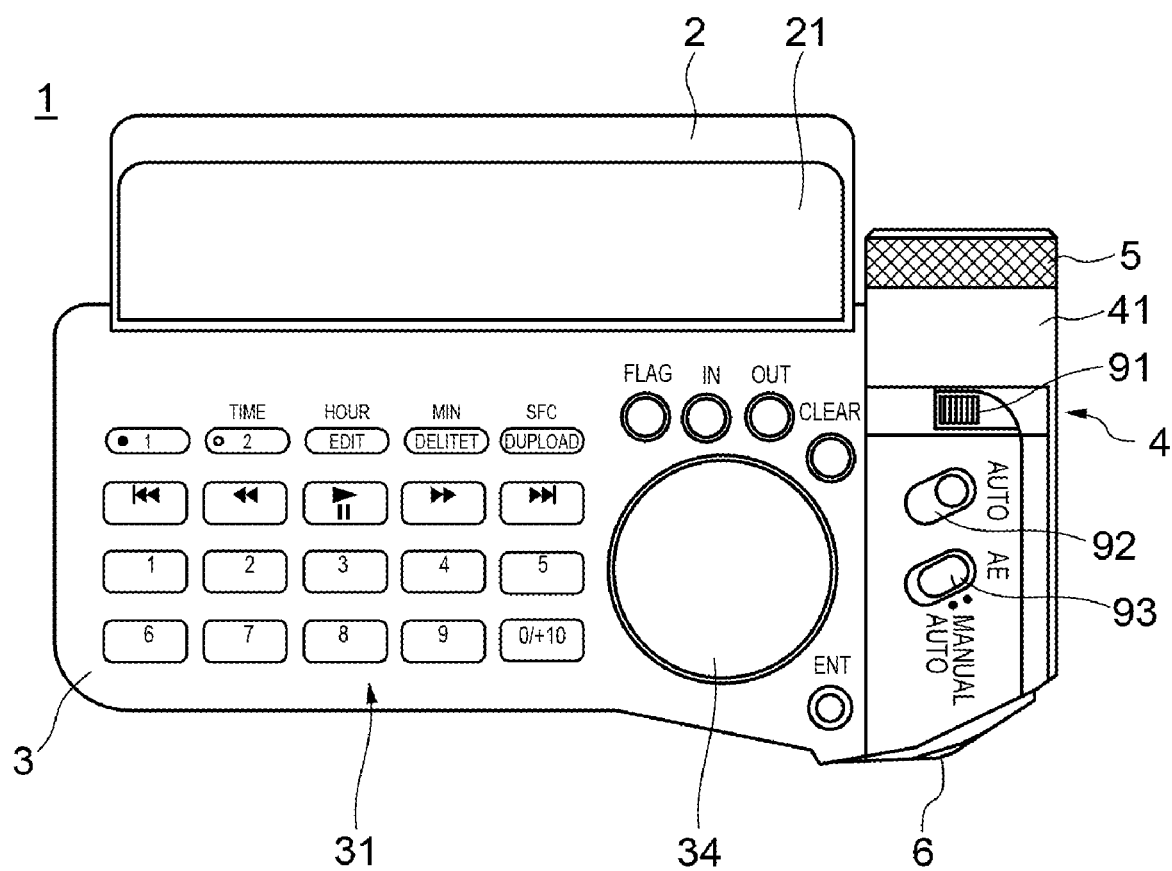
FIG. 8 is a plan view seen from the top of FIG. 6.
Figure 9:
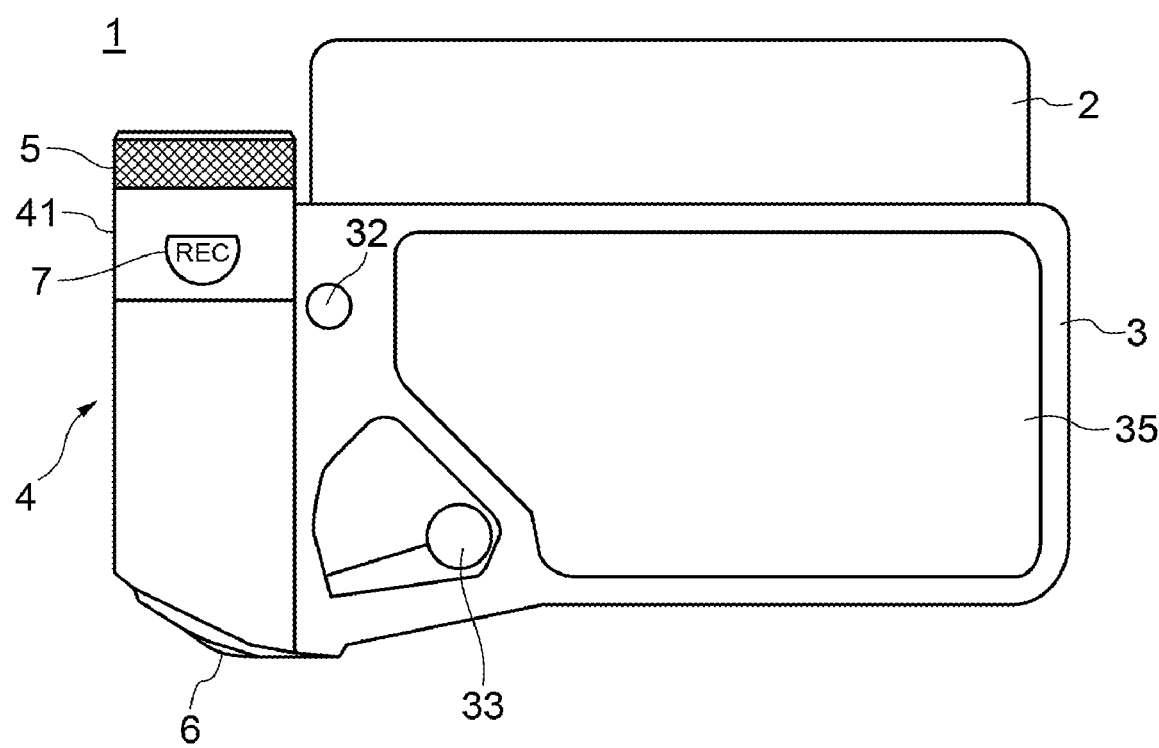
FIG. 9 is a bottom view of FIG. 6.

Next, the form of the information communication terminal 1 when photographing at a low angle or editing will be explained. FIGS. 6 to 9 are diagrams showing an example of the form of the information communication terminal according to the exemplary embodiment 1 of the present invention when photographing at a low angle or editing. FIG. 6 is a front view of the information communication terminal seeing from the side of the display unit. FIG. 7 is a back view of the information communication terminal shown in FIG. 6, FIG. 8 is a plan view of the information communication terminal seen from the top of FIG. 6, and FIG. 9 is a bottom view of the information communication terminal shown in FIG. 6.

When photographing at a low angle or editing, the longitudinal direction of the first housing 2 and the longitudinal direction of the second housing 3 are neighbored, and the first housing 2 is arranged so that the display unit 21 and the operating unit 31 face the same side. That is, the side in the longitudinal direction of the first housing 2 is arranged on or above the surface of the second housing 3 along the side in the longitudinal direction of the second housing 3 so that the display unit 21 and the operations unit 31 are seen from the same side. In other words, in order to see the display unit 21 and the operating unit 31 from the same side, the side which does not include (does not arrange) the rotating shaft 42 of the first housing 2 and the side which does not include the opening and closing shaft 41 of the second housing 3 are neighbored. Here, "the same side" means the state at which the photographer can see the display unit 21 and the operating unit 31 at the same time.

More specifically, the information communication terminal 1 is in the state that the first housing 2 is rotated centering on the opening and closing shaft 41 from the carrying state and then rotated centering on the rotating shaft 42, and further the first housing 2 is rotated centering on the opening and closing shaft 41 so as to close. When the first housing 2 is opened centering on the opening and closing shaft 41 firstly, it is opened enough to be rotated centering on the rotating shaft 42. Further, when the first housing 2 is rotated centering on the rotating shaft 42, it is rotated so as to be operated easily when photographing at a low angle or editing. For example, when an angle formed by making the sides in the longitudinal direction of the first housing 2 and the second housing 3 neighbor is defined as an angle A, it is preferable that the angle A becomes between an obtuse angle and 180 degrees. Especially, when photographing at a low angle, the display unit 21 is seen from above. Therefore, it is easier to see the display unit 21 being almost horizontal. Further, after it is formed for photographing at a low angle or editing, it is possible to adjust the first housing 2 to change the angle A in a range from about 90 degrees to 180 degrees. Moreover, in the case of a housing having two shafts such as that of this exemplary embodiment, it is possible that the procedure is performed in one step such that the form of the first housing 2 is changed from the form for being carried to the form for photographing at a low angle or editing by rotating it centering on the rotating shaft 42. However, compared to the procedure in one step, the procedure in three steps described above in which the first housing 2 is rotated centering on the opening and closing shaft 41 and then rotated centering on the rotating shaft 42, and further closed centering on the opening and closing shaft 41 can expect the following effects. For example, in the case of connecting between the housings electrically via wiring, it can be expected to prevent load on the wiring. Further, in the case of getting back into the initial form (the form for being carried, for example), it can prevent from having a while of a time (for the photographer from having trouble for getting back). That is, by putting restrictions on the procedure to change the form and by performing the displacement into the predetermined form surely, it can be expected to make operations to change the form easy as a result.

Moreover, the first housing 2 is supported by the rotating shaft 42 at the end of one side in the short direction on the side of the opening and closing shaft 41, as described above. Therefore, when the first housing 2 is rotated centering on the rotating shaft 42, the first housing 2 is arranged at one side in the direction of the rotating shaft for the rotating shaft 42, for example, at one side for the direction of the rotating shaft with the rotating shaft 42 being a base point (upper side or lower side, or, right side or left side). In other words, the first housing 2 is not arranged at both sides in the direction of the rotating shaft with the rotating shaft 42 being a base point. Thereby, as shown in FIG. 6, the side in the longitudinal direction of the first housing 2 can be arranged on or above the surface of the second housing 3. The first housing 2 may be contact with the surface of the second housing 3 or may be arranged above the surface of the second housing 3.

Further, the rotating shaft 42 is arranged at the end of the opening and closing shaft 41, which is the side on which the imaging unit 5 is arranged. Therefore, when the side in the longitudinal direction of the first housing 2 is arranged on or above the surface of the second housing 3, the side in the longitudinal direction of the first housing 2 is arranged along the longitudinal direction on the side of the imaging unit 5 of the second housing 3. Thereby, it is possible to avoid arranging the first housing 2 on the operating unit 31, and the entire operating unit 31 can be operated. As described above, the rotating shaft 42 may be arranged at the end of the opening and closing shaft 41 so as to operate the entire operating unit 31.

Further, as shown in FIG. 9, it is preferable to arrange the second photography operating unit 7 so as to be a bottom surface when the information communication terminal 1 is holed with a hand when photographing at a low angle. By arranging the second photography operating unit 7 at the bottom, for example, when photographing at a low position with holding the information communication terminal 1 with a hand, it is possible to operate the start and stop of photographing by pushing the second photography operating unit 7 up with fingers. In this operation when photographing at a low angle, it does not need to shift the information communication terminal 1 to the other hand, which makes it easier to operate than the case to push the first photography operating unit 6.

Further, it is preferable to arrange the second photography operating unit 7 so as to be on the top when photographing oneself (FIG. 6). Also, when photographing at a low angle, it is preferable to arrange the second photography operating unit 7 so as to be underneath along with the rotation of the opening and closing shaft 41 (FIG. 9). Therefore, the second photography operating unit 7 is arranged on the opening and closing shaft 41 so as to be underneath when photographing at a low angle. And, when photographing oneself, it is preferable that the second photography operating unit 7 becomes on the top by arranging the first housing 2 and the second housing 3 almost horizontally. In the case of arranging as describe above, the second photography operating unit 7 is covered with the second housing 3 at the form for photographing an object shown in FIGS. 2 and 3. Therefore, it prevents from pushing the second photography operating unit 7 down carelessly.

Moreover, when editing, by arranging the information communication terminal 1 as shown in FIGS. 6 to 9, the photographer can input commands for editing by the operating unit 31 and proceed with editing work while confirming the edited contents on the display unit 21. Therefore, the photographer does not need to move photographed image information to another editing device and the like, and it becomes possible to edit the photographed image directly. Consequently, it is possible to reduce a time for editing, and another editing device does not need to be carried. Moreover, as shown in FIG. 4 but not shown in FIGS. 6 to 9, it is possible to perform photography or editing by setting the tripod to the tripod screw 32. It is preferable that the tripod screw 32 is located at the position where it is capable of supporting with stability when photographing oneself and editing. For example, when the tripod screw 32 is arranged on the side of the hinge unit 4 than on the center of the second housing 3, it is expected to balance and be stable.

Figure 10:
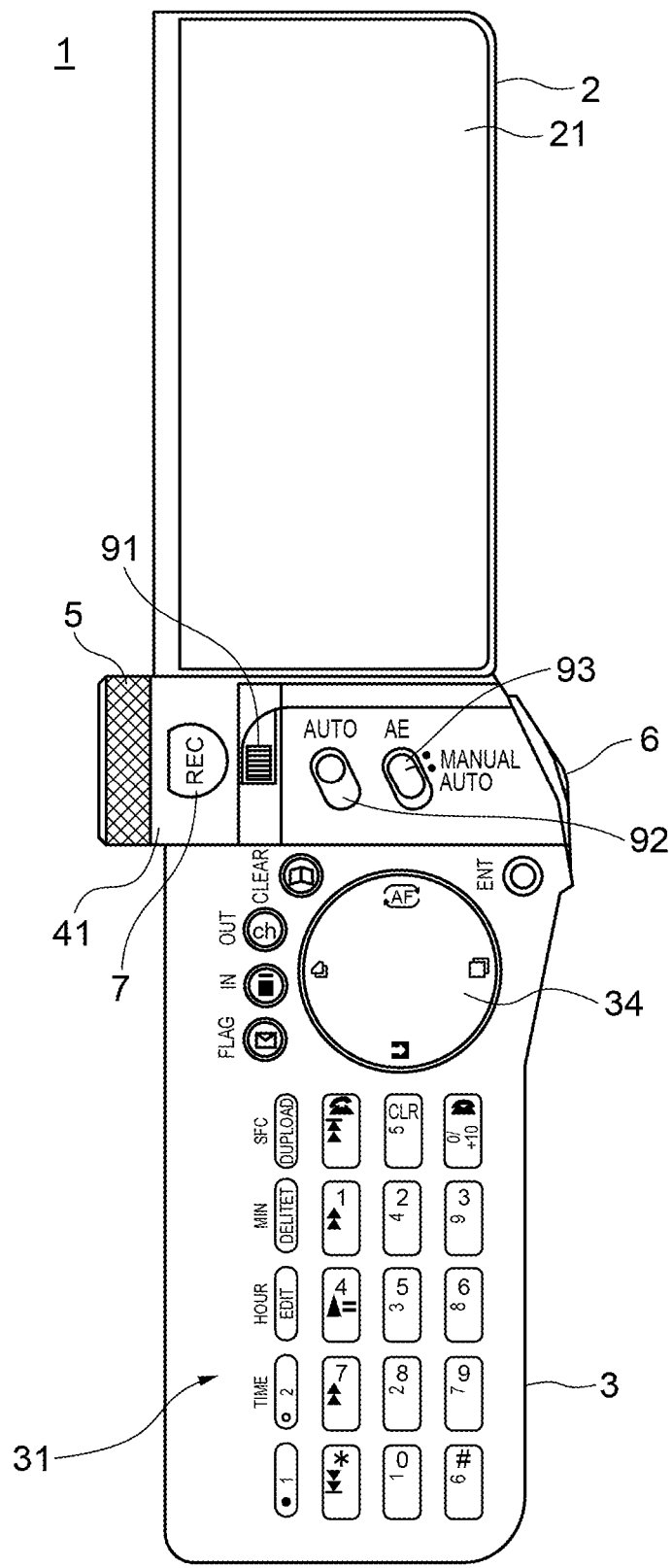
FIG. 10 shows an example of the form for communicating of the information communication terminal according to the exemplary embodiment 1 of the invention and is a front view in the state the information communication terminal is opened.
Figure 11:
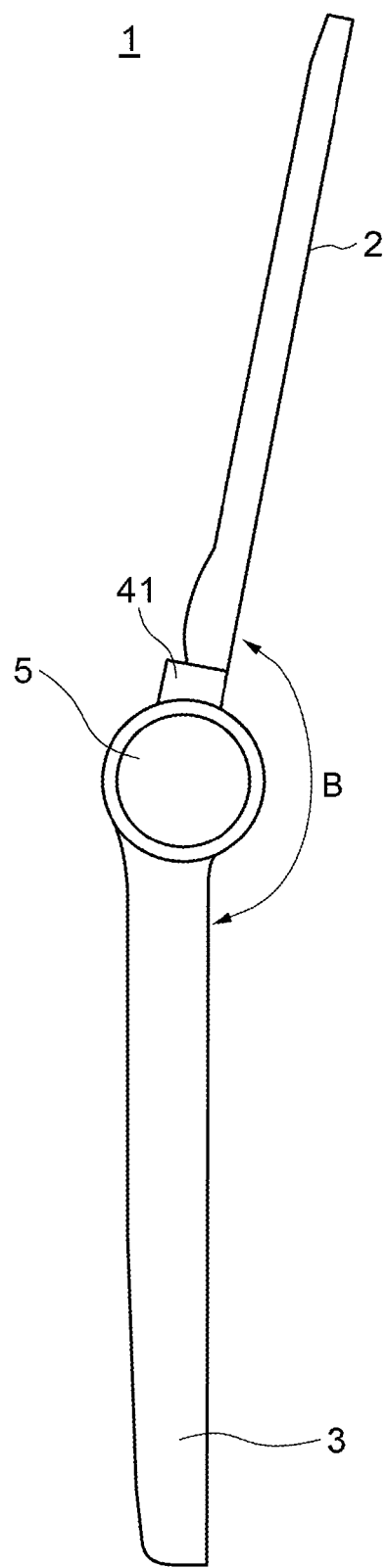
FIG. 11 is a left side view of FIG. 10.

Next, the form of the information communication terminal 1 when communicating will be explained. FIG. 10 shows an example of the form of the information communication terminal when communicating according to the exemplary embodiment 1 of the invention, and it is a front view in the state that the information communication terminal is opened. FIG. 11 is a left side view of FIG. 10. When communicating, the short direction of the first housing 2 and the short direction of the second housing 3 are neighbored through the hinge unit 4. And, the first housing 2 is arranged so that the display unit 21 and the operating unit 31 face the same side. In other words, the side including the rotating shaft 42 of the first housing 2 and the side including the opening and closing shaft 41 of the second housing 3 are neighbored so that the display unit 21 and the operating unit 31 face the same side. More specifically, the information communication terminal 1 is in the state that the first housing 2 is opened centering on the opening and closing shaft 41 so that the display unit 21 and the operating unit 31 can be seen from the same side. Thereby, one side in the short direction of the first housing 2 and one side in the short direction of the second housing 3 are arranged so as to neighbor through the hinge unit 4 along the direction of the opening and closing shaft. The "same side" means the state that the photographer can see the display unit 21 and the operating unit 31 at the same time. For example, it is preferable that the first housing 2 and the second housing 3 are opened by the opening and closing shaft 41 in such a way that an angle B shown in FIG. 11 is from an obtuse angle to 180 degrees.

Further, the setting of an operation key of the operating unit 31 is changed when communicating. Details will be explained below, however, the display of the operating unit 31 is changed from the display shown in FIG. 8 to the display shown in FIG. 10. Thereby, the operating unit 31 has the same arrangement as an operation key of a portable phone, and it becomes possible to operate it as the portable phone. As described above, the information communication terminal 1 is easily operated by changing the setting of the operation key so as to adapt to the arrangement to be used by the photographer.

Figure 12A:
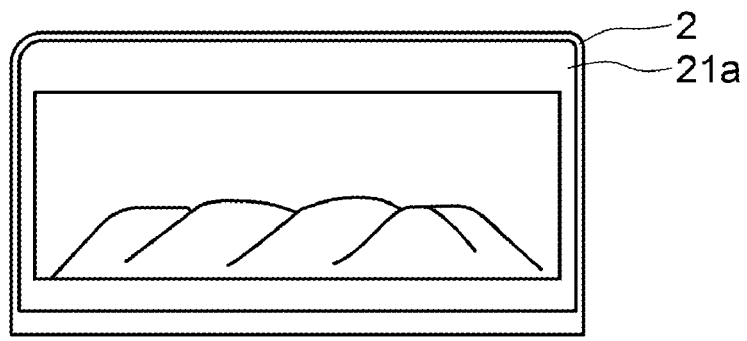
FIG. 12(a) shows an example of the display screen when photographing an object.
Figure 12B:
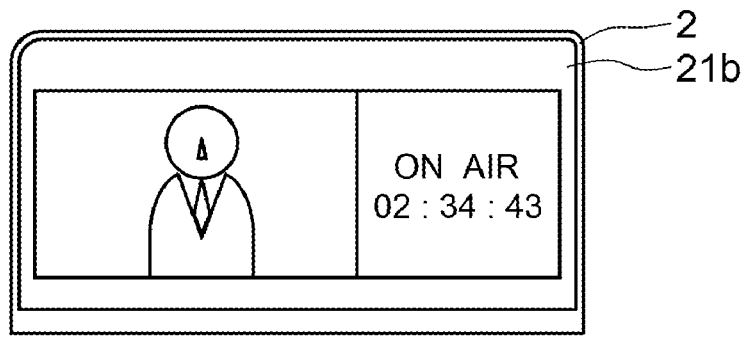
FIG. 12(b) shows an example of that when photographing oneself.
Figure 12C:
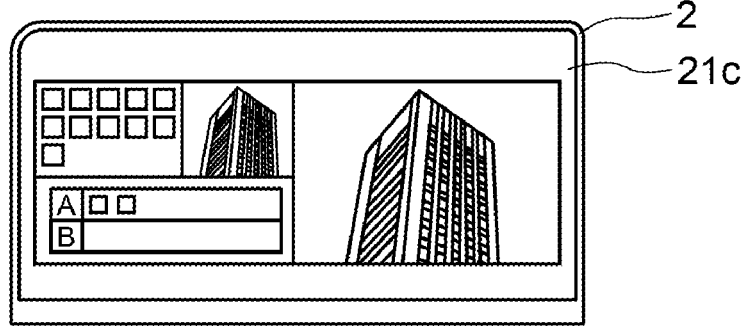
FIG. 12(c) shows an example of that when editing.
Figure 12D:
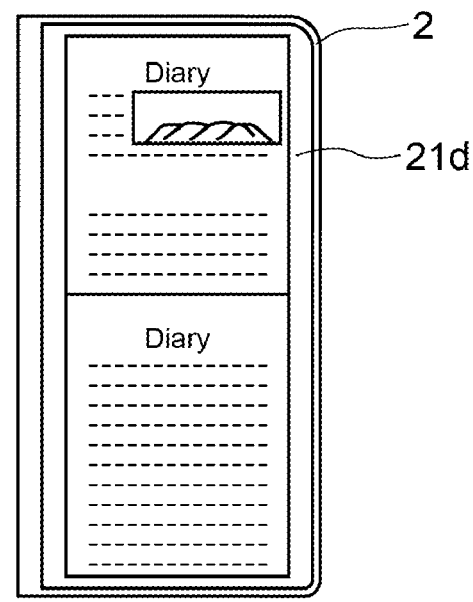
FIG. 12(d) shows an example of that when communicating.

Next, the layout of the display screen included in the display unit 21 will be explained. FIG. 12 is a diagram showing a display example of the image information of the information communication terminal according to the exemplary embodiment 1 of the invention. FIG. 12(a) shows an example of the display screen when photographing an object, FIG. 12(b) shows an example when photographing oneself, FIG. 12(c) shows an example when editing, and FIG. 12(d) shows an example when communicating. As a display unit 21a shown in FIG. 12(a), the display unit 21 sets the display screen with enlarging it in the longitudinal direction of the first housing 2. Therefore, the screen in landscape size (cinema scope size) is possible to be applied. Consequently, it is possible to display an image without changing the size of the photographed image in the case where the imaging unit 5 photographs the image in cinema scope size. Further, as shown in FIGS. 12(b) to 12(d), by dividing the display screen into plurality, it can be used for a plurality of applications. For example, when photographing oneself, it is possible to display the photographed image on left side and to display information indicating the attributes of the image such as a photography time on right side, as shown on a display unit 21b. Further, as shown on a display unit 21c, it is possible to display the image to be edited on right side and to display information relating to the image in being edited on left side, when editing. Moreover, when communicating, for example, in the case of updating a blog on the Internet, it is possible to display the display state on the Internet on upper side and to display information in being edited on lower side, as shown on a display unit 21d.

Subsequently, the configuration of respective functions and the setting of the operation key of the information communication terminal 1 will be explained. FIG. 13 is a block diagram showing a configuration example of respective functions of the information communication terminal according to the exemplary embodiment 1 of the invention. The information communication terminal 1 includes a speaker 98, an audio processing unit 99, a communication unit 101, a recording unit 102, an information processing unit 103, a state detecting unit 104, a light source unit 105, a control unit 106, a sensor 107, a central processing unit (CPU) 108, a memory 109 and a terminal for connecting to an external device, for example, a universal serial bus (USB) terminal (not shown), in addition to the imaging unit 5, the display unit 21 and the operating unit 31 described above.

The imaging unit 5 obtains (photographs) an image. The display unit 21 is composed of a liquid crystal display device and the like, for example. It displays and outputs information such as images, graphics, characters and symbols (an image signal processing). The operating unit 31 includes a circular operator 34 (four-direction key and contact operator), a numerical keypad and the like, and accepts operation input by a user. The speaker 98 outputs sonant such as music sound or alarm sound. The audio processing unit 99 performs the processing of an audio signal which is input/output via a transmitter (microphone) and a receiver (speaker).

The communication unit 101 sends and receives information to and from a wireless base station, which is not shown, by wireless communication via an antenna. For example, when image information is sent, intended address and the image information to be sent is specified based on the information input by the operating unit 31, and the communication unit 101 sends the image information to the specified address.

The recording unit 102 records information such as the image information photographed by the imaging unit 5 and the image information after edited, temporarily. For example, the recording unit 102 stores address book information, sent and received e-mail information, incoming and outgoing call information, content information, photographed images, application program information and settings of a portable wireless terminal. The information processing unit 103 performs a function of processing information such as displaying and editing the image information recorded in the recording unit 102 based on the instruction input by the operating unit 31.

The state detecting unit 104 detects which arrangement state the information communication terminal 1 is in, based on information detected by the sensor 107. More specifically, the opening and closing state and the rotation state (mutual position) between the first housing 2 and the second housing 3 are detected by the known sensor 107 such as a magnetic/hall element, a convex portion/pushing switch or an acceleration sensor. The light source unit 105 lights up and illuminates the operation key. For the light source unit 105, an incandescent lamp, a light-emitting diode (LED), a neon lamp or the like are used, for example. The light source unit 105 is arranged within respective operation key units.

The control unit 106 instructs and controls the operation of the information processing unit 103 and the light source unit 105 based on an instruction input from the operating unit 31 and the result detected by the state detecting unit 104. Further, the control unit 106 controls a telephone function, a mail function, an Internet connection function, a camera function, a content playback function and functions included in the other terminals, and respective units.

The sensor 107 is a plurality of measuring instruments to detect the arrangement state of the information communication terminal 1. The CPU 108 controls over the information communication terminal 1. For example, when respective functions are performed by software such as programs, an instruction is executed by loading the instruction to the memory 109.

A terminal to connect to an external device is arranged on the side in the short direction on the opposite side of the hinge unit 4 of the second housing 3, for example. The terminal is provided with a cover for covering the terminal on the side of the second housing 3. When the cover is opened, the terminal is exposed. Further, the cover is fixed in an open state, and when the information communication terminal is placed on a flat surface (on a desk) with a lid 35 for housing a battery of the second housing 3 being a bottom side, the height is adjusted so that one end of the hinge unit 4 and the cover which is fixed with opened are substantially horizontal.

Next, the setting of the operation key will be explained. In the information communication terminal 1 of the exemplary embodiment, the operating unit 31 includes the setting of a photography corresponding key (an example of a first operation key) and the setting of a communication corresponding key (an example of a second operation key) which is different from the photography corresponding key. The setting example of the photography corresponding key is shown on the operating unit 31 in FIG. 8, and the setting example of the communication corresponding key is shown in FIG. 10. The photography corresponding key is displayed horizontally, that is, the vertical direction of characters is parallel to the opening and closing shaft. It is mainly used for the case where the photographer inputs characters with the second housing 3 being laid sideways (the side in the longitudinal direction is sideways) when editing. The communication corresponding key is displayed longitudinally, that is, the vertical direction of characters is perpendicular to the opening and closing shaft. It is used for the case where the photographer inputs characters with the second housing 3 being laid lengthwise (the side in the longitudinal direction is lengthwise) when communicating.

As shown in FIG. 8, the characters of the photography corresponding key are printed on the surface where the operating unit is arranged. Further, as shown in FIG. 10, the communication corresponding key is displayed within the key at the position different from the printed character of the photography corresponding key. This is because, when communicating, the light source unit 105 arranged within the key lights up and illuminates the operating unit 31 so as to display the operation key. Therefore, when communicating, both the photography corresponding key and the communication corresponding key can be seen. However, although not shown in FIG. 10, by using light whose color is different from the color of displayed characters on the photography corresponding key and illuminating, it is possible to display the communication corresponding key clearly when communicating. For example, by using blue as the color of printed characters of the photography corresponding key and red as the color that illuminates the communication corresponding key, the photographer can select the operation key easily.

Further, in this exemplary embodiment, it is supposed that the information communication terminal 1 that a switching mode with which a user preliminarily selects switching of the operation key is provided. For example, by switching ON/OFF, the operation key is switched when being ON, and the operation key is not switched and keeps the fixed state when being OFF. When it is set not to switch the operation key, the operation key may be switched by a manual operation.

Subsequently, operations to switch the operation key will be explained. In the exemplary embodiment, when the information communication terminal 1 is arranged for communicating (the fourth state), the operation key is set to the communication corresponding key. In other states, it is set to the photography corresponding key. A flowchart in FIG. 14 shows an operation example in which the operation key is set in the exemplary embodiment 1. Firstly, the control unit 106 determines whether the switching mode to change the setting of the operation key is selected (S11). When the switching mode is not selected (No in S11), the processing after step S12 is not performed until the switching mode is selected. On the other hand, when the switching mode is selected (Yes in S11), the state detecting unit 104 detects the arrangement state of the information communication terminal 1 based on data detected by the sensor 107 and informs the control unit 106. The control unit 106 obtains the result detected by the state detecting unit 104 (S12). More specifically, the control unit 106 determines whether the first housing 2 and the second housing 3 is in the open state centering on the opening and closing shaft 41 (S13).

When the information communication terminal 1 is in the state (the fourth state) for communicating (Yes in S13), the control unit 106 sets the function of the operating unit 31 so as to correspond to the communication corresponding key (S14), lights up the light source unit 105, illuminates the operating unit 31 and display the communication corresponding key (S15). For example, a LED, which is arranged within each operation key unit included in the operating unit 31, illuminates each operation key.

Further, the information communication terminal 1 is in the state (the first state, the second state and the third state) for photographing (No in S13), the control unit 106 sets the function of the operating unit 31 so as to correspond to the photography corresponding key (S16), and de-actuates the light source unit 105 when it lights up.

In the exemplary embodiment, the information communication terminal 1 is supposed to be used for photographing or for editing compared to for communicating. Therefore, the operation key for communicating is displayed by lighting up the light source unit 105 and illuminating the operating unit 31. As described above, by illuminating and displaying the operation key which is used less time, it is possible to reduce power consumption.

Figure 15B:
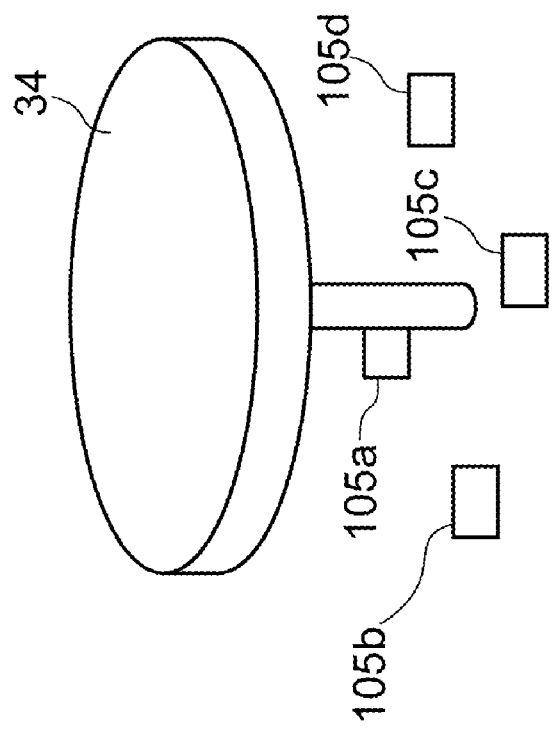
FIG. 15(b) is a perspective view.
Figure 15A:
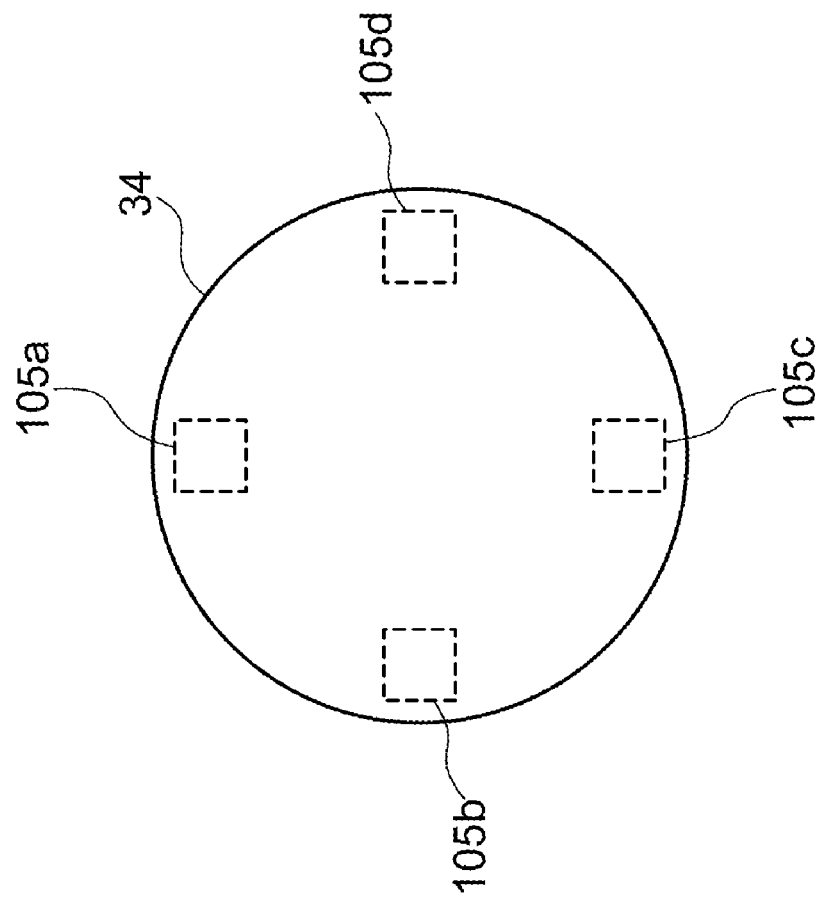
FIG. 15(a) is a front view.

Further, the operating unit 31 in the exemplary embodiment includes the operator 34. The operator 34 advance an image displayed on the display unit 21 frame by frame when editing and performs the function of arrow key when communicating. As for the operator 34, the function when communicating is also displayed within the operator 34. Thereby, as it does not need to provide a display space for the arrow key newly, it is possible to use the space effectively. In addition, it is possible to downsize the information communication terminal 1. For example, as shown in FIG. 15, light source units of the number to be displayed 105a to 105d are arranged under the operator 34. In a front view of FIG. 15(a), the light source units 105a to 105d arranged on the reverse side of the operator 34 are indicated with a dotted line. When the light source units 105a to 105d light up, the operation key is displayed. Consequently, by changing the setting of the function of the displayed operation key, the operating unit 31 can achieves various functions.

As described above, in this exemplary embodiment, one aspect to achieve the functions of photographing, creating (editing) and sending (transmitting) has been explained. According to the exemplary embodiment, it is possible to improve operability to achieve respective functions. Especially, it is capable of corresponding to information communication terminals for professional such as journalists who use respective function very often and requires high-performance functions, for example.

Exemplary Embodiment 2

In the exemplary embodiment 1, the case where the communication corresponding key for communicating is illuminated has been explained. In an exemplary embodiment 2, another aspect to switch the setting of the operation key will be explained. The information communication terminal has the same configuration as that shown in FIG. 13 except for the followings. The operating unit 31 includes a plurality of settings of the operation key capable of the setting of a horizontally-displayed operation key (an example of the first operation key) in which the vertical direction of characters is parallel to the opening and closing shaft and the setting of a longitudinally-displayed operation key (an example of the second operation key) in which the vertical direction of characters is perpendicular to the opening and closing shaft different from the horizontally-displayed operation key. The control unit 106 switches the settings of the horizontally-displayed operation key and the longitudinally-displayed operation key. At this time, as to the operation key, the horizontally-displayed operation key and the longitudinally-displayed operation key may be both displayed by the light source unit 105. One of them may be printed on the surface where the operating unit 31 of the second housing 3 is arranged, and the other one may be displayed by being illuminated by the light source unit 105. In the case where both operation keys are illuminated, the horizontally-displayed operation key and the longitudinally-displayed operation key can be distinguished more easily by changing colors with each other.

Figure 16:
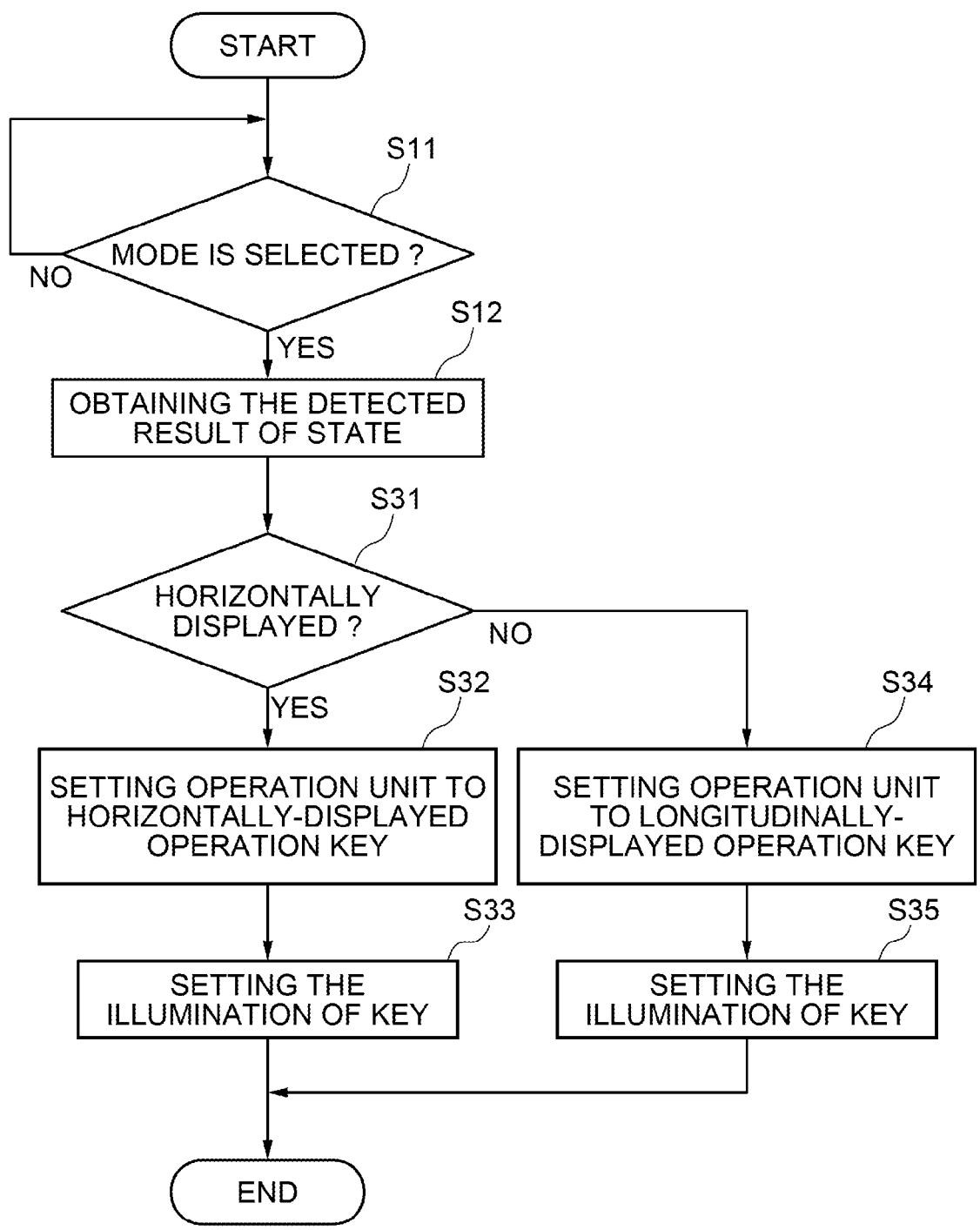
FIG. 16 is a flowchart showing an operation example in which an operation key is set in an exemplary embodiment 2.

FIG. 16 is a flowchart showing an operation example in which the operation key is set in the exemplary embodiment 2. The operations having the same step numbers are the same as that in FIG. 14; therefore, the explanation will be omitted. That the information communication terminal 1 may not have the function of setting a mode is the same as the case in the exemplary embodiment 1. FIG. 16 shows an operation example in which the horizontally-displayed operation key and the longitudinally-displayed operation key are illuminated by the light source unit 105. In the case where one of them is printed, the explanation will be omitted because it can be achieved by the same operation as that in the exemplary embodiment 1.

The control unit 106 determines whether the present information communication terminal 1 is in the form of horizontal display or longitudinal display, based on the detected result informed by the state detecting unit 104 (S31). When the information communication terminal 1 is in the form of horizontal display (Yes in S31), the control unit 106 sets the function of the operating unit 31 so as to correspond to the horizontally-displayed operation key (S32), lights up the light source unit 105 for the horizontally-displayed operation key and illuminates the operating unit 31 so as to display the horizontally-displayed operation key (S33). Further, when the information communication terminal 1 is in the form of longitudinal display (No in S31), the control unit 106 sets the function of the operating unit 31 so as to correspond to the longitudinally-displayed operation key (S34), lights up the light source unit 105 for the longitudinally-displayed operation key and illuminates the operating unit 31 so as to display the longitudinally-displayed operation key (S35).

Further, in the exemplary embodiment 1, the case where the information communication terminal is capable of having four arrangements has been explained. However, it is possible to apply the operating unit having the first operation key and the second operation key to the information communication terminal which does not always have all arrangements. The information communication terminal 1 may have a plurality of arrangements so as to switch the first operation key and the second operation key. For example, the information communication terminal may not have the arrangement for photographing oneself shown in FIGS. 2 and 3.

Moreover, the setting of the operation key may be two or more. If a plurality of settings of the operation key is corresponded to the form detected by the state detecting unit 104, the control unit 106 can perform respective settings of the operation key.

As described above, according to this exemplary embodiment, the information communication terminal can provide the setting of the operation key adjusting to the function to be achieved by including a plurality of settings of the operation key. Further, when the operating unit 31 is used at longitudinal and horizontal positions, it is possible to display the operation key being suitable for the direction of the arrangement. Thereby, the operability of the information communication terminal can be improved.

Exemplary Embodiment 3

Figure 17:
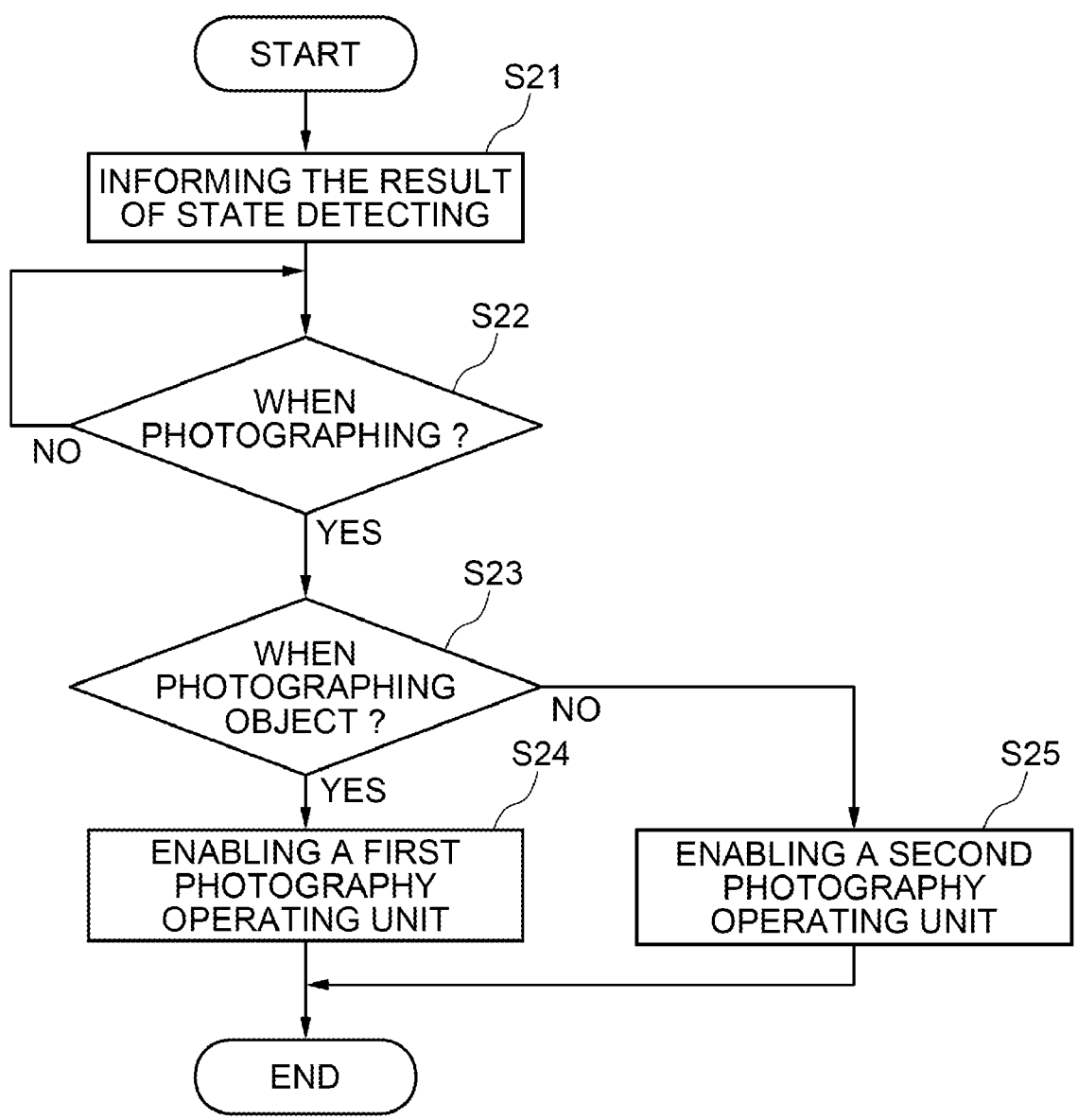
FIG. 17 is a flowchart showing an operation example in which the function of a photography operating unit is restricted in an exemplary embodiment 3.

In the exemplary embodiment 1, the second photography operating unit 7 operates always effectively. In an exemplary embodiment 3, the case where the function is restricted based on the form of the information communication terminal 1 will be explained. FIG. 17 is a flowchart showing an operation example in which the function of the photography operating unit is restricted. The state detecting unit 104 detects which state of the first state to the fourth state the information communication terminal 1 is in based on data detected by the sensor 107 (S21). The control unit 106 determines which state of the first state to the third state the information communication terminal 1 is in when photographing, based on the detected result of the state detecting unit 104 (S12). In the case of photographing (Yes in S22), the control unit 106 enables the first photography operating unit 6 and disables the second photography operating unit 7 when photographing an object (Yes in S23). In other cases, the control unit 106 enables the second photography operating unit 7 and disables the first photography operating unit 6 when photographing oneself and photographing at a low angle (No in S23).

The above operation is one example. The first photography operating unit and the second photography operating unit may be both enabled when photographing oneself and photographing at a low angle, for example. Further, the information communication terminal 1 may include a third photography operating unit arranged at another position. For example, it may be arranged at the side of the second housing 3.

As described above, a plurality of photography operating units to instruct the start and stop of photographing are arranged depending on the photography state. And, the function of the photography operating units are enabled or disabled respectively depending on the arrangement of the information communication terminal 1. Thereby, it is possible to make the operation to instruct photography easy and to prevent malfunction.

Exemplary Embodiment 4

In the exemplary embodiment 1, the case where the specified image information is sent to the address input by the operating unit 31 at the time of communication has been explained. However, it is also possible to send the image photographed by the imaging unit 5 in real time. For example, the photographed image information is sent to an intended server specified in advance (or intended address) in real time. More specifically, for the operation key of the operating unit 31, a key (button) to specify the destination is set. By pushing the key in which the destination is set at the start of photographing or on photographing, the photographed image information is sent to the server by the communication unit 101 without being recorded in the recording unit 102 temporally.

As described above, it is possible to send the photographed image in real time when photographing without limited to the time when the information communication terminal 1 is in the form for communicating. Further, when the information communication terminal 1 is in the form for editing, it is possible to send the image information. For example, by displaying the destination and the image information to be sent on the display unit 21 and making a user select by operating the key, the edited image information is sent.

As described above, according to the exemplary embodiment, it is possible to send image information in the forms to perform respective functions of photographing and editing the image. Thereby, the sending operation becomes possible in a series of operations to perform respective functions. Therefore, as a series of operations can be performed without changing the form of the information communication terminal, the operations becomes easier. Further, it improves the efficiency in work.

As described above, according to the exemplary embodiment of the present invention, the information communication terminal is capable of selecting the best form (the displacement of the first housing 2 and the second housing 3) in the respective states such as communicating or photographing. For example, it is possible to apply the best key function in respective states in which the information communication terminal is: carried by a user; put on a desk; or supported by the tripod, or in respective modes such as communicating or photographing. Therefore, even with the portable information communication terminal to achieve various forms and various functions, it is possible to provide easy operations by a user.

The present invention is not limited to the exemplary embodiments described above. Within the scope of the present invention, it is possible to change, add and convert each component in the above exemplary embodiments to the content that one skilled in the art can think of easily.

As described above, the present invention has been explained with reference to the embodiments (and the examples). However, the present invention is not limited to the above embodiments (and the examples). As to the configuration and details of the present invention, various modifications that one skilled in the art understands can be performed within the scope of the present invention.

The invention claimed is:
1. An information communication terminal, comprising:
a first housing having a display unit;
a second housing having an operating unit;
a hinge unit including an opening and closing shaft and a rotating shaft rotating around the opening and closing shaft with facing the radial direction of the opening and closing shaft;
an imaging unit arranged at one end in the direction of the opening and closing shaft of the hinge unit, with at least the direction of the opening and closing shaft being a photography direction; and
at least one photography operating unit for making the imaging unit operate, wherein
the first housing is supported by the rotating shaft and combined with the second housing by the opening and closing shaft for being able to open and close,
further, the first housing is rotatably supported by the rotating shaft, and
the direction of the display unit for the operating unit of the second housing and the imaging unit is capable of changing, wherein the first housing is capable of being arranged in:
(a) a first state in which the display unit faces in a direction opposite to the photographing direction of the imaging unit;
(b) a second state in which the display unit faces in the photographing direction of the imaging unit;
(c) a third state in which the direction of the rotating shaft of the first housing and a direction perpendicular to the direction of the opening and closing shaft of the second housing are neighbored, and the display unit and the operating unit face the same side; and
(d) a fourth state in which a direction perpendicular to the direction of the rotating shaft of the first housing and the direction of the opening and closing shaft of the second housing are neighbored through the hinge unit, and the display unit and the operating unit face the same side,
wherein, in the third state, the side in the direction of the rotating shaft of the first housing is arranged on or above the surface of the second housing on which the operating unit is arranged; and
the rotating shaft is arranged at the end of the opening and closing shaft so that the entire operating unit can be operated when the side in the direction of the rotating shaft of the first housing is arranged on or above the surface of the second housing.

2. The information communication terminal as claimed in claim 1, wherein the first housing is supported by the rotating shaft at the end of the side perpendicular to the direction of the rotating shaft.

3. The information communication terminal as claimed in claim 1, further comprising:
a recording unit for recording image information photographed by the imaging unit;
an information processing unit for processing the image information recorded in the recording unit based on an instruction input from the operating unit; and
a communication unit for sending the image information recorded in the recording unit or the image information in real time photographed by the imaging unit via wireless communication based on an instruction input by the operating unit.

4. The information communication terminal as claimed in claim 1, wherein the first housing is supported by the rotating shaft at the end of the side on which the imaging unit is arranged, of the sides perpendicular to the direction of the rotating shaft, and
the rotating shaft is arranged at the end of the side on which the imaging unit is arranged, of the opening and closing shaft.

5. An information communication terminal, comprising:
a first housing having a display unit;
a second housing having an operating unit;
a hinge unit including an opening and closing shaft and a rotating shaft rotating around the opening and closing shaft with facing the radial direction of the opening and closing shaft;
an imaging unit arranged at one end in the direction of the opening and closing shaft of the hinge unit, with at least the direction of the opening and closing shaft being a photography direction; and
at least one photography operating unit for making the imaging unit operate, wherein
the first housing is supported by the rotating shaft and combined with the second housing by the opening and closing shaft for being able to open and close,
further, the first housing is rotatably supported by the rotating shaft, and
the direction of the display unit for the operating unit of the second housing and the imaging unit is capable of changing,
wherein the at least one photography operating unit includes:
a first photography operating unit arranged at the other end in the direction of the opening and closing shaft of the hinge unit; and
a second photography operating unit arranged on the opening and closing shaft and rotating with the opening and closing shaft.

6. The information communication terminal as claimed in claim 5, wherein the second photography operating unit is arranged on the opening and closing shaft at the position for operating the imaging unit when photographing by using the display unit of the first housing.

7. An information communication terminal, comprising:
a first housing having a display unit;
a second housing having an operating unit;
a hinge unit including an opening and closing shaft and a rotating shaft rotating around the opening and closing shaft with facing the radial direction of the opening and closing shaft;
an imaging unit arranged at one end in the direction of the opening and closing shaft of the hinge unit, with at least the direction of the opening and closing shaft being a photography direction; and
at least one photography operating unit for making the imaging unit operate, wherein
the first housing is supported by the rotating shaft and combined with the second housing by the opening and closing shaft for being able to open and close,
further, the first housing is rotatably supported by the rotating shaft, and
the direction of the display unit for the operating unit of the second housing and the imaging unit is capable of changing,
wherein the second photography operating unit is covered with the second housing when not being used, covered with the second housing in a first state, and arranged on the opening and closing shaft for being able to be operated from below at the predetermined position.

8. An information communication terminal, comprising:
a first housing having a display unit;
a second housing having an operating unit;
a hinge unit including an opening and closing shaft and a rotating shaft rotating around the opening and closing shaft with facing the radial direction of the opening and closing shaft;
an imaging unit arranged at one end in the direction of the opening and closing shaft of the hinge unit, with at least the direction of the opening and closing shaft being a photography direction; and
at least one photography operating unit for making the imaging unit operate, wherein
the first housing is supported by the rotating shaft and combined with the second housing by the opening and closing shaft for being able to open and close,
further, the first housing is rotatably supported by the rotating shaft, and
the direction of the display unit for the operating unit of the second housing and the imaging unit is capable of changing,
wherein the operating unit includes:
an operation key in which the operation is switched depending on the predetermined arrangement state; and the setting of a first operation key and the setting of a second operation key being different from the first operation key and adapting to a fourth state, and the second housing includes:

a light source unit for illuminating the operation key by lighting up;

a state detecting unit for detecting the arrangement state of the first housing; and a control unit for switching the operation by the operation key of the operating unit depending on the arrangement state of the first housing detected by the state detecting unit, and in the case of detecting the fourth state, switching the setting from the first operation key to the second operation key, and lighting up the light source unit to illuminate the second operation key.

9. The information communication terminal as claimed in claim 8, wherein the operating unit includes an operator to perform the function of accepting an instruction to advance frame by frame the image information displayed on the display unit in a third state and the function of arrow key in the fourth state.

10. The information communication terminal as claimed in claim 8, wherein the control unit stops the function of the at least one photography operating unit based on the result of the state detecting unit.

11. An information communication terminal, comprising:

a first housing having a display unit;

a second housing having an operating unit;

a hinge unit including an opening and closing shaft and a rotating shaft rotating around the opening and closing shaft with facing the radial direction of the opening and closing shaft;

an imaging unit arranged at one end in the direction of the opening and closing shaft of the hinge unit, with at least the direction of the opening and closing shaft being a photography direction; and at least one photography operating unit for making the imaging unit operate, wherein the first housing is supported by the rotating shaft and combined with the second housing by the opening and closing shaft for being able to open and close, further, the first housing is rotatably supported by the rotating shaft, and the direction of the display unit for the operating unit of the second housing and the imaging unit is capable of changing, wherein the second housing includes an operating unit being capable of the setting of a first operation key horizontally displayed in which the vertical direction of characters is parallel to the opening and closing shaft and the setting of a second operation key longitudinally displayed in which the vertical direction of characters is perpendicular to the opening and closing shaft, the information communication terminal further comprising:

a recording unit for recording image information photographed by the imaging unit;

a state detecting unit for detecting the arrangement relation between the first housing and the second housing;

a control unit for switching between the setting of the first operation key and the setting of the second operation key based on the result detected by the state detecting unit;

an information processing unit for processing the image information recorded in the recording unit based on an instruction input from the operating unit; and a communication unit for sending the image information recorded in the recording unit or the image information photographed by the imaging unit via wireless communication based on an instruction input by the operating unit.

12. The information communication terminal as claimed in claim 11, further comprising a light source unit for illuminating an operation key by lighting up, wherein the control unit displays at least one of the first operation key and the second operation key by lighting up the light source unit and illuminating the operation key.

13. The information communication terminal as claimed in claim 12, wherein:

the display of either the first operation key or the second operation key is printed on the operating unit; and the control unit illuminates the operation key by lighting up the light source unit in the case of switching the setting of the operation key to the display of the operation key which is not printed.

* * * * *